(12) United States Patent
Takahashi et al.

(10) Patent No.: US 10,822,471 B2
(45) Date of Patent: Nov. 3, 2020

(54) FRICTION DRIVE BELT

(75) Inventors: Shinji Takahashi, Hyogo (JP);
Kenichiro Furuta, Hyogo (JP);
Hiroyuki Shiriike, Hyogo (JP);
Tomoyuki Yamada, Hyogo (JP);
Hiroyuki Tachibana, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 1446 days.

(21) Appl. No.: 13/202,414

(22) PCT Filed: Feb. 24, 2010

(86) PCT No.: PCT/JP2010/001249
§ 371 (c)(1),
(2), (4) Date: Aug. 19, 2011

(87) PCT Pub. No.: WO2010/098091
PCT Pub. Date: Sep. 2, 2010

(65) Prior Publication Data
US 2011/0300981 A1  Dec. 8, 2011

(30) Foreign Application Priority Data

Feb. 24, 2009 (JP) ................. 2009-040396
Jul. 17, 2009 (JP) ................. 2009-169382

(51) Int. Cl.
*F16G 1/06* (2006.01)
*C08K 3/34* (2006.01)
(Continued)

(52) U.S. Cl.
CPC ............. *C08K 3/346* (2013.01); *C08K 3/06* (2013.01); *C08K 3/26* (2013.01); *C08K 5/04* (2013.01);
(Continued)

(58) Field of Classification Search
CPC .. F16G 5/20; C08K 3/346; C08K 7/26; C08L 23/16
(Continued)

(56) References Cited

U.S. PATENT DOCUMENTS 7,887,448 B2     2/2011  Hineno et al.
2005/0143209 A1* 6/2005  Shibutani ............... 474/260
(Continued)

FOREIGN PATENT DOCUMENTS

DE  102007042496  5/2008
DE  112008002997  10/2010
(Continued)

OTHER PUBLICATIONS

Machine translation JP 2004-256730.*
(Continued)

*Primary Examiner* — Gerard Higgins
*Assistant Examiner* — Kevin C Ortman, Jr.
(74) *Attorney, Agent, or Firm* — Nixon & Vanderhye

(57) ABSTRACT

A friction drive belt (B) includes a belt body (10) that is wrapped around pulleys in contact therewith to transmit power. At least a pulley contact portion (15) of the belt main body (10) is made of a rubber composition containing 30-80 parts by mass of at least one layered silicate selected from a smectite group and a vermiculite group, per 100 parts by mass of raw rubber containing an ethylene-α-olefin elastomer.

12 Claims, 3 Drawing Sheets

(51) Int. Cl.
| | |
|---|---|
| C08L 23/16 | (2006.01) |
| F16G 5/20 | (2006.01) |
| C08L 77/00 | (2006.01) |
| C08K 3/26 | (2006.01) |
| C08K 7/26 | (2006.01) |
| C08K 5/04 | (2006.01) |
| C08K 3/06 | (2006.01) |
| C08L 91/00 | (2006.01) |

(52) U.S. Cl.
CPC ............... *C08K 7/26* (2013.01); *C08L 23/16* (2013.01); *C08L 77/00* (2013.01); *C08L 91/00* (2013.01); *F16G 5/20* (2013.01); C08L 2205/16 (2013.01); C08L 2312/00 (2013.01)

(58) Field of Classification Search
USPC .......... 428/36.9, 331, 35.7, 36.91, 389, 402, 428/516, 192, 211.1, 213, 323, 325, 330, 428/338, 375, 380, 384, 413, 423.1, 454, 428/474.7, 474.9, 496, 500, 512, 523
See application file for complete search history.

(56) References Cited

U.S. PATENT DOCUMENTS

| | | | | |
|---|---|---|---|---|
| 2007/0060431 | A1 | 3/2007 | Hineno et al. | |
| 2007/0082777 | A1* | 4/2007 | Nishida | F16G 5/06 474/237 |
| 2010/0036025 | A1* | 2/2010 | Rodgers | B60C 1/0008 524/52 |
| 2010/0167861 | A1* | 7/2010 | Shiriike | F16G 1/08 474/263 |
| 2010/0240809 | A1* | 9/2010 | Yamada | C08L 23/0815 524/81 |
| 2011/0094645 | A1* | 4/2011 | Rodgers | B60C 1/0008 152/510 |

FOREIGN PATENT DOCUMENTS

| | | | |
|---|---|---|---|
| JP | 63-125541 | 5/1988 | |
| JP | 2000-039049 | 2/2000 | |
| JP | 2001082547 A | 3/2001 | |
| JP | 2004-256730 | 9/2004 | |
| JP | 2006-064174 | 3/2006 | |
| JP | 2006-118661 | 5/2006 | |
| JP | WO 2006075598 A1 * | 7/2006 | ............... F16G 1/08 |
| JP | 2006-257598 | 9/2006 | |
| JP | 2007-120526 | 5/2007 | |
| JP | 2007-232205 | 9/2007 | |
| JP | 2008-185162 | 8/2008 | |
| JP | 2008-195914 | 8/2008 | |
| JP | WO 2009060748 A1 * | 5/2009 | ........... C08L 23/0815 |

OTHER PUBLICATIONS

Machine translation JP-2007-232205.*
Alexandre, et al., "Polymer-layered silicate nanocomposites: preparation, properties and uses of new class of materials," Mat. Sci. and Eng., 28, 2000, p. 1-63.*
Martin (R. Torrence Martin, "Adsorbed water on clay: a review," Clays and Clay Minerals; 1960 v. 9; No. 1; p. 28-70).*
White (W. Arthur White, "Water sorption properties of homoionic clay minerals," Report of Investigations 208, Illinois State Geological Survey, p. 1-46, 1958).*
International Search Report, PCT/JP2010/001249, dated Mar. 23, 2010.

* cited by examiner

FRICTION DRIVE BELT

TECHNICAL FIELD

The present invention relates to friction drive belts having a belt body wrapped around pulleys in contact therewith to transmit power, and manufacturing methods thereof, and belt transmission systems including the same.

BACKGROUND ART

Recently, it has been increasingly required to prevent generation of abnormal noise of V-ribbed belts during driving of automobiles. There are many kinds of abnormal noise of the V-ribbed belts, and one of them is belt slip noise that is generated when the V-ribbed belt is immersed in water.

As a solution, Patent Document 1 discloses that a ribbed portion serving as a friction drive face is made of a rubber composition containing 10-25 parts by weight of a plasticizer having a solubility parameter of 8.3-10.7 $(cal/cm^3)^{1/2}$ and 60-110 parts by weight of an inorganic filler per 100 parts by weight of an ethylene-α-olefin elastomer.

Patent Document 2 discloses that a power transmission face portion is made of a rubber composition containing at least 5 parts by weight of a hydrophilic inorganic filler per 100 parts by weight of rubber.

Patent Document 3 discloses that a compression rubber layer is made of a rubber composition containing 10-40 parts by weight of polyamide short fibers, 30-60 parts by weight of carbon black, and 10-60 parts by weight of an inorganic filler made of a metal carbonate and/or a metal silicate per 100 parts by weight of an ethylene-α-olefin elastomer containing 50-70 wt % of ethylene, and having tan δ of 0.80 or more as obtained by dynamic viscoelasticity measurement in a tensile mode at a frequency of 10 Hz and a temperature of 0° C.

Patent Document 4 discloses that a ribbed portion forming a friction drive face is made of a rubber composition containing 1-25 parts by weight of a surfactant per 100 parts by weight of an ethylene-α-olefin elastomer.

Patent Document 5 discloses that a ribbed portion forming a friction drive face is made of a rubber composition containing 5-25 parts by weight of an ether ester plasticizer per 100 parts by weight of an ethylene-α-olefin elastomer.

CITATION LIST

Patent Document

PATENT DOCUMENT 1: Japanese Patent Publication No. 2007-232205
PATENT DOCUMENT 2: Japanese Patent Publication No. 2007-120526
PATENT DOCUMENT 3: Japanese Patent Publication No. 2006-64174
PATENT DOCUMENT 4: Japanese Patent Publication No. 2008-185162
PATENT DOCUMENT 5: Japanese Patent Publication No. 2008-195914

SUMMARY OF THE INVENTION

The present invention is a friction drive belt including: a belt body that is wrapped around pulleys in contact therewith to transmit power, wherein at least a pulley contact portion of the belt main body is made of a rubber composition containing 30-80 parts by mass of at least one layered silicate selected from a smectite group and a vermiculite group, per 100 parts by mass of raw rubber containing an ethylene-α-olefin elastomer.

DESCRIPTION OF EMBODIMENTS

An embodiment will be described in detail below with reference to the accompanying drawings.

Figure 1:
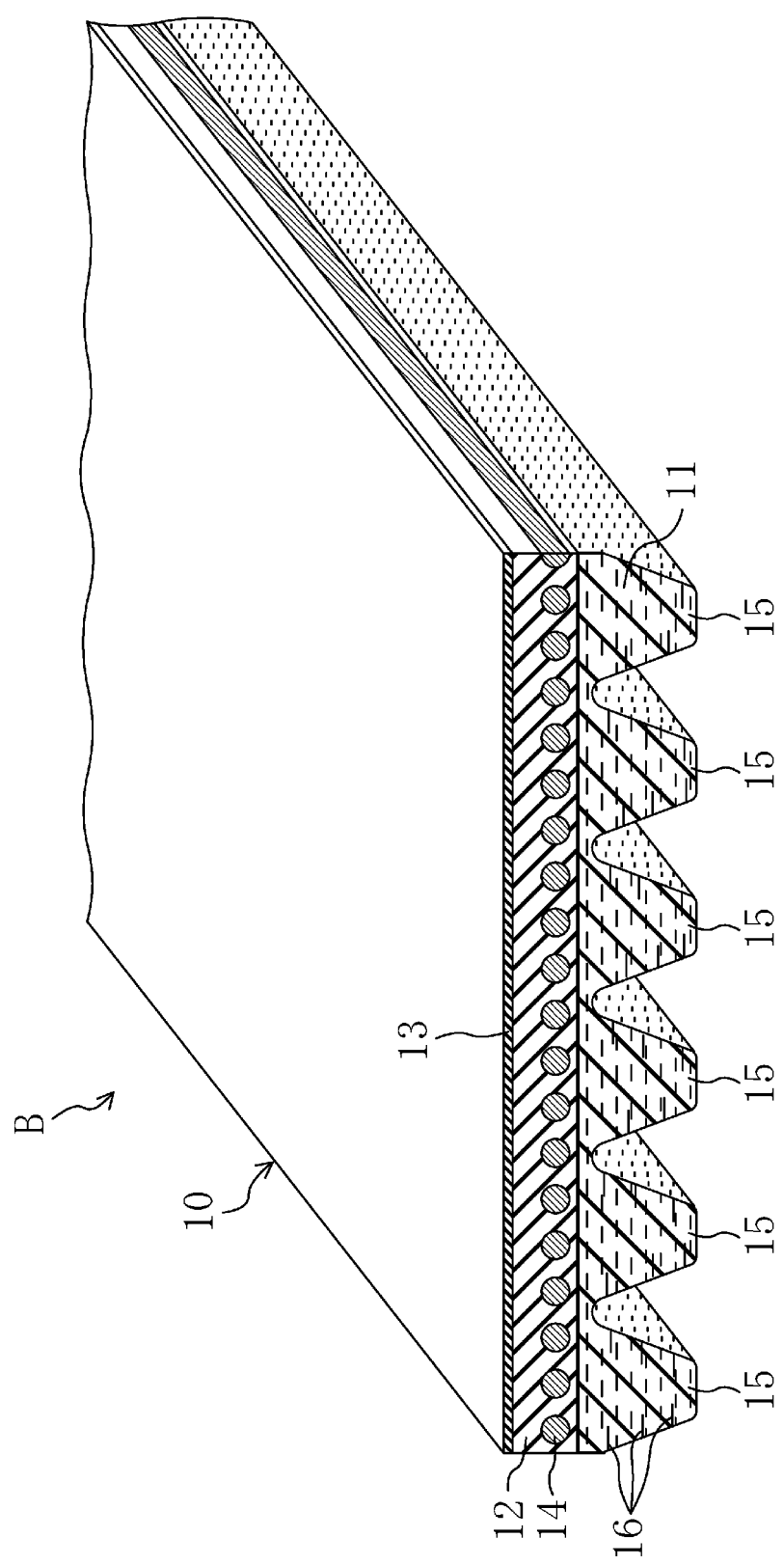
FIG. 1 is a perspective view of a V-ribbed belt according to an embodiment.

FIG. 1 shows a V-ribbed belt B (a friction drive belt) according to the present embodiment. This V-ribbed belt B is used for, e.g., accessory drive belt transmission systems provided in engine compartments of automobiles, and has a circumference of 700-3,000 mm, a width of 10-36 mm, and a thickness of 4.0-5.0 mm.

The V-ribbed belt B of the present embodiment includes a V-ribbed belt body 10 having a three-layer configuration of a compression rubber layer 11 on the inner side of the belt, an adhesion rubber layer 12 as an intermediate layer, and a backing rubber layer 13 on the outer side of the belt. A core wire 14 is embedded in the adhesion rubber layer 12 so as to form a helical pattern having a pitch in the width direction of the belt.

The compression rubber layer 11 is provided so that a plurality of V-shaped ribs 15 forming a pulley contact portion (a portion that is to contact with pulleys) are tapered toward the inner side of the belt. Each of the plurality of V-shaped ribs 15 is formed in a ridge shape having a substantially inverted triangular cross section and extending in the longitudinal direction of the belt, and the plurality of V-shaped ribs 15 are arranged parallel to each other in the width direction of the belt. Each of the V-shaped ribs 15 has, e.g., a height of 2.0-3.0 mm, and a width of 1.0-3.6 mm at its base end. The number of ribs is, e.g., 3-6 (6 ribs in FIG. 1). The compression rubber layer 11 is made of a rubber composition produced by kneading a mixture of raw rubber and various compounding agents to form an uncrosslinked rubber composition, heating and pressing the uncrosslinked rubber composition, and crosslinking the uncrosslinked rubber composition by a crosslinker.

The raw rubber of the rubber composition that forms the compression rubber layer 11 includes an ethylene-α-olefin elastomer. Examples of the ethylene-α-olefin elastomer are ethylene-propylene-diene rubber (EPDM), an ethylene-propylene copolymer (EPR), an ethylene-butene copolymer (EBM), an ethylene-octene copolymer (EOM), etc. The raw rubber may include either a single ethylene-α-olefin elastomer or a plurality of ethylene-α-olefin elastomers. The ethylene content of the ethylene-α-olefin elastomer is, e.g., 50-80 mass %.

The content of the ethylene-α-olefin elastomer in the raw rubber is preferably 60 mass % or more, more preferably 80 mass % or more, and most preferably 100 mass %. That is, the raw rubber is most preferably made only of the ethylene- α-olefin elastomer. Other rubbers included in the raw rubber are, e.g., chloroprene rubber (CR), chlorosulfonated polyethylene rubber (CSM), hydrogenated acrylonitrile rubber (H-NBR), etc.

Examples of the compounding agents include a reinforcer such as carbon black, a layered silicate, a vulcanization accelerator, a crosslinker, an antioxidant, a softener, etc.

Examples of carbon black as the reinforcer are channel black, furnace black such as SAF, ISAF, N-339, HAF, N-351, MAF, FEF, SRF, GPF, ECF, N-234, etc., thermal black such as FT, MT, etc., and acetylene black. Silica is another example of the reinforcer. The reinforcer may be formed of either a single substance or a plurality of substances. Preferably, the amount of the reinforcer is 30-80 parts by mass per 100 parts by mass of the raw rubber as a satisfactory balance is achieved between wear resistance and bending resistance.

The layered silicate is formed of at least one substance selected from a smectite group and a vermiculite group. Thus, the layered silicate is formed of a single substance or a plurality of substances of the smectite group and/or a single substance or a plurality of substances of the vermiculite group.

The smectite group includes, e.g., montmorillonite, beidellite, saponite, hectorite, etc. The vermiculite group includes, e.g., trioctahedral vermiculite, dioctahedral vermiculite, etc. Montmorillonite of the smectite group is preferable as the layered silicate. Note that the layered silicate may contain a kaolin group in addition to the at least one substance selected from the smectite group and the vermiculite group. The kaolin group includes, e.g., kaolinite, dickite, halloysite, lizardite, amesite, chrysotile, etc.

The layered silicate has a water swelling property, and the swelling power of the layered silicate is preferably 20 ml/2 g or more, and more preferably 40 ml/2 g or more. The swelling power of the layered silicate is measured according to Japan Bentonite Manufacturers Association Standard. Specifically, 2 g of a layered silicate sample and a measuring cylinder (capacity: 200 ml or more) containing water (about 150 ml) are prepared. Then, the layered silicate sample is placed little by little into the measuring cylinder. At this time, the measuring cylinder should not be shaken or vibrated, and is left stationary until the layered silicate is precipitated by absorbing water and swelling. The layered silicate sample is added little by little after the part of the layered silicate sample that has already placed in the measuring cylinder sinks to a certain extent. After 2 g of the layered silicate sample is placed into the measuring cylinder, the measuring cylinder is left stationary for 24 hours, and the boundary between the layered silicate sample that has swelled and has been precipitated and supernatant liquid in the measuring cylinder is read as the swelling power.

The cation exchange capacity (CEC) of the layered silicate is preferably 70 meg/100 g or more, and more preferably 90 meg/100 g or more. The cation exchange capacity of the layered silicate is measured according to Japan Bentonite Manufacturers Association Standard. Specifically, 0.4-0.5 g of a layered silicate sample is prepared and placed into a leaching tube. Then, 1 N of an ammonium acetate solution is placed little by little into the leaching tube. After the ammonium acetate solution completely penetrates the sample, the leaching tube is placed in an apparatus, and 100 ml of 1 N of ammonium acetate solution is added to a leaching solution container, and a faucet is adjusted to cause the ammonium acetate solution to flow so that leaching is finished in 4-24 hours. After sufficiently washing the leaching solution container with water, 50 ml of 80 mass % of ethyl alcohol is placed into the leaching solution container, and is caused to flow to wash the layered silicate sample. Then, after sufficiently washing the leaching solution container and a receiving container with water, 100 ml of 10 mass % of a potassium chloride solution is placed into the leaching solution container, and is caused to flow to exchange ammonium ions in the layered silicate sample with potassium ions. The potassium chloride solution in the receiving container is transferred to a distillation apparatus, and ammonia is distilled according to a Kjeldahl method (at this time, a small number of zinc particles are added in order to prevent bumping), and distillate is received in a container containing 0.1 N of sulfuric acid, and an excess amount of sulfuric acid is titrated by 0.1 N of sodium hydroxide solution. A blank test is simultaneously conducted to calculate cation exchange capacity based on the following expression.

$$\text{Cation exchange capacity}=((A-B)\times f\times 10)/(S\times(100-M)/100)$$

A: the amount of 0.1 N of sodium hydroxide required for the blank test (ml)

B: the amount of 0.1 N of sodium hydroxide actually required (ml)

f: factor of 0.1 N of sodium hydroxide

S: the amount of sample obtained (g)

M: water content of sample (mass %)

The grain size of the layered silicate is preferably 0.05-120 μm, and more preferably 0.5-80 μm. The amount of layered silicate to be added per 100 parts by mass of the raw rubber is 30-80 parts by mass, preferably 30-60 parts by mass, and more preferably 30-45 parts by mass.

Since the rubber composition that forms the compression rubber layer 11 contains the layered silicate, the rubber composition has a detection peak of $2\theta=9°$ or less, and more preferably $2\theta=8°$ or less, in a measuring range $2\theta$ of 0.2-15° in X-ray diffractometry.

The ratio of the area of the layered silicate that is exposed at the surfaces of the V-shaped ribs 15 to the total area of the surfaces of the V-shaped ribs 15 is preferably 12% or more, and more preferably 16% or more. The ratio of the area of the layered silicate that is exposed at the surfaces of the V-shaped ribs 15 to the total area of the surfaces of the V-shaped ribs 15 can be obtained by calculating the proportion of the area of bright spots of silicon (Si) elements in a mapping image of the Si elements by scanning electron microscopy (e.g., at 300 magnifications). An example of a scanning electron microscope is Scanning Electron Microscope S-4800 made by Hitachi High-Technologies Corporation, and an example of an elemental analyzer is X-Ray Analyzer EMAX EX-250 made by HORIBA, Ltd.

In the belt configuration disclosed in Patent Document 1, since a plasticizer is bled, adhesive wear tends to occur, and abnormal noise tends to be generated when the belt is not immersed in water. In the belt configuration disclosed in Patent Document 2, wettability of the hydrophilic inorganic filler with water is not high enough, and abnormal noise is not sufficiently suppressed under high load conditions. In the belt configuration disclosed in Patent Document 3, abnormal noise is not sufficiently suppressed in a condition in which a slip ratio is very high, such as when the belt is immersed in water. In the belt configurations disclosed in Patent Documents 4 and 5, affinity between the rubber surface and water is not high enough, and thus abnormal noise is not sufficiently suppressed. However, in the V-ribbed belt B of the present embodiment, the compression rubber layer 11 in which the V-shaped ribs 15 that form the pulley contact portion of the V-ribbed belt body 10 is made of a rubber composition containing 30-80 parts by mass of at least one layered silicate selected from the smectite group and the vermiculite group, per 100 parts by mass of the raw rubber containing the ethylene-α-olefin elastomer. Thus, abnormal noise can be effectively suppressed when the belt is immersed in water.

Examples of the vulcanization accelerator include metal oxides such as magnesium oxide and zinc oxide (zinc flower), metal carbonates, fatty acids such as stearic acid, derivatives thereof, etc. The vulcanization accelerator may be formed of either a single substance or a plurality of substances. For example, 0.5-8 parts by mass of the vulcanization accelerator is added per 100 parts by mass of the raw rubber.

Examples of the crosslinker include sulfur, organic peroxides, etc. Sulfur, an organic peroxide, or a combination of sulfur and an organic peroxide may be used as the crosslinker. In the case of sulfur, 0.5-4.0 parts by mass of the crosslinker is preferably added per 100 parts by mass of the raw rubber. In the case of the organic peroxide, e.g., 0.5-8 parts by mass of the crosslinker is added to 100 parts by mass of the raw rubber.

Examples of the antioxidant include amines, quinolines, hydroquinone derivatives, phenols, and phosphites. The antioxidant may be formed of either a single substance or a plurality of substances. For example, 0-8 parts by mass of the antioxidant is added per 100 parts by mass of the raw rubber.

Examples of the softener include petroleum softeners, mineral oil softeners such as paraffin wax, vegetable oil softeners such as castor oil, cottonseed oil, linseed oil, rapeseed oil, soybean oil, palm oil, coconut oil, peanut oil, haze wax, rosin, and pine oil. The softener may be formed of either a single substance or a plurality of substances. Regarding the softeners other than the petroleum softeners, for example, 2-30 parts by mass of the softener is added per 100 parts by mass of the raw rubber.

The rubber composition that forms the compression rubber layer 11 may contain short fibers 16. In this case, the short fibers 16 are provided so as to be aligned in the width direction of the belt. It is preferable that some of the short fibers 14 be exposed at the surfaces of the V-shaped ribs 15 and stick out of the surfaces of the V-shaped ribs 15.

Examples of the short fibers 16 include nylon short fibers, vinylon short fibers, aramid short fibers, polyester short fibers, and cotton short fibers. The short fibers 16 are manufactured by, e.g., subjecting long fibers to an adhesion treatment of heating the long fibers after soaking them in a resorcinol formaldehyde latex aqueous solution (hereinafter referred to as the "RFL aqueous solution"), etc., and cutting the long fibers along the longitudinal direction into pieces having a predetermined width. The short fibers 16 have a length of, e.g., 0.2-5.0 mm, and a diameter of, e.g., 10-50 μm. For example, 3-50 parts by mass of the short fibers 16 are added per 100 parts by mass of the raw rubber. Note that the short fibers 16 may be flocked in the surfaces of the V-shaped ribs 15, instead of being contained in the rubber composition.

The rate of change in mass of the rubber composition of the compression rubber layer 11 after immersion in water for one minute is preferably 0.1% or more, and more preferably 0.2% or more. The rate of change in mass of the rubber composition of the compression rubber layer 11 after immersion in water for 10 hours is preferably 0.3% or more, and more preferably 0.4% or more. Note that this rate of change in mass can be calculated by a calculation method according to Japanese Industrial Standards JIS K6258 by conducting a test in which both surfaces of a test piece according to JIS K6258 are immersed in water for one minute or 10 hours.

The water content of the rubber composition of the compression rubber layer 11 is preferably 0.70 mass % or more, more preferably 0.70-3.0 mass %, and further more preferably 0.70-1.5 mass %. Note that if the water content of the rubber composition of the compression rubber layer 11 is 0.70 mass % or more, abnormal noise can be effectively suppressed when the amount of the layered silicate is 5 to 80 parts by mass (preferably 10 to 80 mass %) per 100 parts by mass of the raw rubber, in conditions including when the belt is immersed in water.

The adhesion rubber layer 12 is formed in a band shape having a rectangular cross section that is longer in the horizontal direction than in the vertical direction, and has a thickness of, e.g., 1.0-2.5 mm. The backing rubber layer 13 is also formed in a band shape having a rectangular cross section that is longer in the horizontal direction than in the vertical direction, and has a thickness of, e.g., 0.4-0.8 mm. Each of the adhesion rubber layer 12 and the backing rubber layer 13 is made of a rubber composition produced by kneading a mixture of raw rubber and various compounding agents to form an uncrosslinked rubber composition, heating and pressing the uncrosslinked rubber composition, and crosslinking the uncrosslinked rubber composition by a crosslinker. Note that for example, reinforcing fabric such as woven fabric, knit fabric, or nonwoven fabric formed by yarns of, e.g., cotton, polyamide fibers, polyester fibers, aramid fibers, etc., may be provided instead of the backing rubber layer 13.

Examples of the raw rubber of the rubber composition that forms each of the adhesion rubber layer 12 and the backing rubber layer 13 include an ethylene-α-olefin elastomer, chloroprene rubber (CR), chlorosulfonated polyethylene rubber (CSM), hydrogenated acrylonitrile rubber (H-NBR), etc. The raw rubber of the adhesion rubber layer 12 is preferably the same as that of the compression rubber layer 11.

As in the compression rubber layer 11, examples of the compounding agents include a reinforcer such as carbon black, a layered silicate, a vulcanization accelerator, a crosslinker, an antioxidant, a softener, etc.

The compression rubber layer 11, the adhesion rubber layer 12, and the backing rubber layer 13 may be made of rubber compositions having different mixtures, respectively, or may be made of a rubber composition having the same mixture.

The core wire 14 is formed by twisted yarns such as polyester fibers (PET), polyethylene naphthalate fibers (PEN), aramid fibers, or vinylon fibers. In order to provide the core wire 14 with an adhesion property to the V-ribbed belt body 10, the core wire 14 is subjected to an adhesion treatment of heating the core wire after soaking it in an RFL aqueous solution and/or an adhesion treatment of drying the core wire after soaking it in rubber cement, before a molding process.

The V-ribbed belt B of the present embodiment can be manufactured by a known method by using a rubber composition containing a layered silicate to form the compression rubber layer 11. In the case of manufacturing the V-ribbed belt B in which the rubber composition of the compression rubber layer 11 has a water content of 0.7 mass % or more, a molded V-ribbed belt subjected to a molding process may be placed in a water vapor atmosphere or water for a predetermined period of time. The V-ribbed belt is preferably placed in the water vapor atmosphere or water for 8 hours, and more preferably for 12-24 hours.

When in use, the V-ribbed belt B of the present embodiment is wrapped around, e.g., a crankshaft pulley, a power steering pulley, an alternating-current (AC) generator pulley, a tensioner pulley, a water pump pulley, and an air conditioner pulley in an accessory drive belt transmission system.

Figure 2:
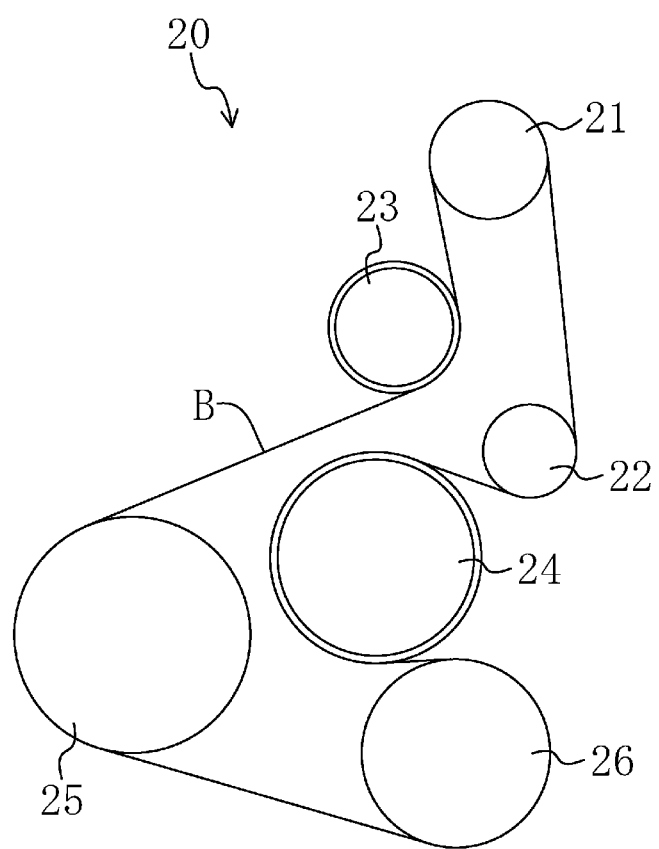
FIG. 2 is a diagram showing a layout of pulleys of an accessory drive belt transmission system of an automobile.

FIG. 2 shows a layout of pulleys of an accessory drive belt transmission system 20 of an automobile using the V-ribbed belt B of the present embodiment. This accessory drive belt transmission system 20 is of a serpentine drive type in which the V-ribbed belt B is wrapped around 6 pulleys, namely 4 ribbed pulleys and 2 flat pulleys, to transmit power.

This accessory drive belt transmission system 20 includes a power steering pulley 21 located at an uppermost position, an AC generator pulley 22 placed below the power steering pulley 21, a tensioner pulley 23 as a flat pulley placed on the lower left side of the power steering pulley 21, a water pump pulley 24 as a flat pulley placed below the tensioner pulley 23, a crankshaft pulley 25 placed on the lower left side of the tensioner pulley 23, and an air conditioner pulley 26 placed on the lower right side of the crankshaft pulley 25. All the pulleys except the tensioner pulley 23 and the water pump pulley 24 as the flat pulleys are ribbed pulleys. These ribbed and flat pulleys are formed by, e.g., pressing or casting of a metal, or resin molding of nylon resin, phenol resin, etc., and have a diameter of $\phi$50-150 mm.

In this accessory drive belt transmission system 20, the V-ribbed belt B is sequentially wrapped around the power steering pulley 21 with the V-shaped ribs 15 being in contact therewith, the tensioner pulley 23 with the back face of the belt being in contact therewith, and the crankshaft pulley 25 and the air conditioner pulley 26 with the V-shaped ribs 15 being in contact therewith. The V-ribbed belt B is further wrapped around the water pump pulley 24 with the back face of the belt being in contact therewith, and the AC generator pulley 22 with the V-shaped ribs 13 being in contact therewith, and returns to the power steering pulley 21. The belt span length, which is a length of the V-ribbed belt B between the pulleys, is, e.g., 50-300 mm. Misalignment between the pulleys is 0 to 2°.

Note that although the V-ribbed belt B is described in the present embodiment, the present invention is not particularly limited to this. The present invention is also applicable to a raw edge V-belt in which a belt body made of a rubber composition is wrapped around pulleys in contact therewith to transmit power.

EXAMPLES

[Test Evaluation 1]
(Rubber Composition)
The following rubber compositions 1-21 were prepared. Their respective configurations are also shown in Tables 1 and 2.

<Rubber Composition 1>
As rubber composition 1, an uncrosslinked rubber composition was produced by mixing 100 parts by mass of EPDM (made by Mitsui Chemical, Inc., trade name: EPT3045) as raw rubber with 60 parts by mass of HAF carbon black (made by Tokai Carbon Co., Ltd., trade name: SEAST SO), 30 parts by mass of montmorillonite (made by HOJUN, trade name: Bengel A, swelling power: 46 ml/2 g, cation exchange capacity: 94 meg/100 g), 5 parts by mass of zinc oxide (made by Sakai Chemical Industry Co., Ltd., trade name: Zinc Flower Class 2), 2 parts by mass of an antioxidant (made by Ouchi Shinko Chemical Industrial Co., Ltd., trade name: NOCRAC MB), 10 parts by mass of paraffinic oil (made by Idemitsu Kosan Co., Ltd., trade name: Diana Process Oil PS-90), 2.3 parts by mass of sulfur (made by Hosoi Chemical Industry, Co., Ltd., trade name: OIL SULFUR), 1.4 parts by mass of a vulcanization accelerator (made by SANSHIN CHEMICAL INDUSTRY CO., LTD., trade name: TET, EZ, MSA), and 30 parts by mass of short fibers (made by Asahi Kasei Corporation, trade name: Leona 66, fiber length: 1 mm), and kneading the mixture in an internal kneader for about 5 minutes.

<Rubber Composition 2>
As rubber composition 2, an uncrosslinked rubber composition was produced which has the same configuration as rubber composition 1 except that rubber composition 2 contains 30 parts by mass of hectorite (made by KUNIMIE INDUSTRIES CO., LTD., trade name: Sumecton HE) per 100 parts by mass of the raw rubber, instead of montmorillonite.

<Rubber Composition 3>
As rubber composition 3, an uncrosslinked rubber composition was produced which has the same configuration as rubber composition 1 except that rubber composition 3 contains 45 parts by mass of montmorillonite per 100 parts by mass of the raw rubber.

<Rubber Composition 4>
As rubber composition 4, an uncrosslinked rubber composition was produced which has the same configuration as rubber composition 1 except that rubber composition 4 contains 55 parts by mass of HAF carbon black and 45 parts by mass of montmorillonite per 100 parts by mass of the raw rubber.

<Rubber Composition 5>
As rubber composition 5, an uncrosslinked rubber composition was produced which has the same configuration as rubber composition 1 except that rubber composition 5 contains 60 parts by mass of HAF carbon black and 60 parts by mass of montmorillonite per 100 parts by mass of the raw rubber.

<Rubber Composition 6>
As rubber composition 6, an uncrosslinked rubber composition was produced which has the same configuration as rubber composition 1 except that rubber composition 6 contains 50 parts by mass of HAF carbon black and 60 parts by mass of montmorillonite per 100 parts by mass of the raw rubber.

<Rubber Composition 7>
As rubber composition 7, an uncrosslinked rubber composition was produced which has the same configuration as rubber composition 1 except that rubber composition 7 contains 45 parts by mass of HAF carbon black and 80 parts by mass of montmorillonite per 100 parts by mass of the raw rubber.

<Rubber Composition 8>
As rubber composition 8, an uncrosslinked rubber composition was produced which has the same configuration as rubber composition 1 except that rubber composition 8 contains 30 parts by mass of kaolinite (made by SHIRAISHI CALCIUM KAISHA, LTD., trade name: Hard Top Clay) per 100 parts by mass of the raw rubber, instead of montmorillonite.

<Rubber Composition 9>
As rubber composition 9, an uncrosslinked rubber composition was produced which has the same configuration as rubber composition 1 except that rubber composition 9 contains 30 parts by mass of talc (made by Nippon Talc Co., Ltd., trade name: MICRO ACE P-8, a surface treatment material) per 100 parts by mass of the raw rubber, instead of montmorillonite.

<Rubber Composition 10>

As rubber composition 10, an uncrosslinked rubber composition was produced which has the same configuration as rubber composition 1 except that rubber composition 10 contains 30 parts by mass of magnesium oxide (made by Kyowa Chemical Industry Co., Ltd., trade name: MgO-EL) per 100 parts by mass of the raw rubber, instead of montmorillonite.

<Rubber Composition 11>

As rubber composition 11, an uncrosslinked rubber composition was produced which has the same configuration as rubber composition 1 except that rubber composition 11 contains 30 parts by mass of zinc powder (made by HakusuiTech Co., Ltd., trade name: Zinc Dust R) per 100 parts by mass of the raw rubber, instead of montmorillonite.

<Rubber Composition 12>

As rubber composition 12, an uncrosslinked rubber composition was produced which has the same configuration as rubber composition 1 except that rubber composition 12 contains 10 parts by mass of a plasticizer (made by ADEKA CORPORATION, trade name: ADK CIZER RS700) per 100 parts by mass of the raw rubber, instead of montmorillonite and paraffinic oil.

<Rubber Composition 13>

As rubber composition 13, an uncrosslinked rubber composition was produced which has the same configuration as rubber composition 1 except that rubber composition 13 contains 10 parts by mass of a surfactant (made by Rhein Chemie Japan Ltd., trade name: Aflux 54) per 100 parts by mass of the raw rubber, instead of montmorillonite.

<Rubber Composition 14>

As rubber composition 14, an uncrosslinked rubber composition was produced which has the same configuration as rubber composition 1 except that rubber composition 14 contains 10 parts by mass of a water-absorbent resin 1 (made by SUMITOMO SEIKA CHEMICALS CO., LTD., trade name: AQUA KEEP 10SH-NF) per 100 parts by mass of the raw rubber, instead of montmorillonite.

<Rubber Composition 15>

As rubber composition 15, an uncrosslinked rubber composition was produced which has the same configuration as rubber composition 1 except that rubber composition 15 contains 10 parts by mass of a water-absorbent resin 2 (made by SUMITOMO SEIKA CHEMICALS CO., LTD., trade name: AQUA CALK TWB) per 100 parts by mass of the raw rubber, instead of montmorillonite.

<Rubber Composition 16>

As rubber composition 16, an uncrosslinked rubber composition was produced which has the same configuration as rubber composition 1 except that rubber composition 16 contains 3 parts by mass of montmorillonite per 100 parts by mass of the raw rubber.

<Rubber Composition 17>

As rubber composition 17, an uncrosslinked rubber composition was produced which has the same configuration as rubber composition 1 except that rubber composition 17 contains 15 parts by mass of montmorillonite per 100 parts by mass of the raw rubber.

<Rubber Composition 18>

As rubber composition 18, an uncrosslinked rubber composition was produced which has the same configuration as rubber composition 1 except that rubber composition 18 contains 25 parts by mass of montmorillonite per 100 parts by mass of the raw rubber.

<Rubber Composition 19>

As rubber composition 19, an uncrosslinked rubber composition was produced which has the same configuration as rubber composition 1 except that rubber composition 19 contains 90 parts by mass of montmorillonite per 100 parts by mass of the raw rubber.

<Rubber Composition 20>

As rubber composition 20, an uncrosslinked rubber composition was produced which has the same configuration as rubber composition 1 except that rubber composition 20 does not contain montmorillonite.

<Rubber Composition 21>

As rubber composition 21, an uncrosslinked rubber composition was produced which has the same configuration as rubber composition 1 except that rubber composition 21 contains 30 parts by mass of calcium carbonate (made by SHIRAISHI CALCIUM KAISHA, LTD., trade name: Hakuenka CC) per 100 parts by mass of the raw rubber, instead of montmorillonite.

TABLE 1

| | | Rubber Compositions | | | | | | |
|---|---|---|---|---|---|---|---|---|
| | | 1 | 2 | 3 | 4 | 5 | 6 | 7 |
| EPDM | Made By Mitsui Chemicals, Inc., trade name: EPT3045 | 100 | 100 | 100 | 100 | 100 | 100 | 100 |
| HAF carbon black | Made by Tokai Carbon Co., Ltd., trade name: SEAST SO | 60 | 60 | 60 | 55 | 60 | 50 | 45 |
| Montmorillonite | Made by HOJUN, trade name: Bengel A | 30 | | 45 | 45 | 60 | 60 | 80 |
| Hectorite | Made by KUNIMINE INDUSTRIES CO., LTD., trade name: Sumecton HE | | 30 | | | | | |
| Kaolinite | Made by SHIRAISHI CALCIUM KAISHI, LTD., trade name: Hard Top Clay | | | | | | | |
| Talc | Made by made by Nippon Talc Co., Ltd., trade name: MICRO ACE P-8 | | | | | | | |
| Magnesium oxide | Made by Kyowa Chemical Industry Co., Ltd., trade name: MgO-EL | | | | | | | |
| Zinc powder | Made by HakusuiTech Co., Ltd., trade name: Zinc Dust R | | | | | | | |
| Plasticizer | Made by ADEKA CORPORATION, trade name: ADK CIZER RS700 | | | | | | | |
| Surfactant | Made by Rhein Chemie Japan Ltd., trade name: Aflux 54 | | | | | | | |

TABLE 1-continued

|  |  | Rubber Compositions | | | | | | |
|---|---|---|---|---|---|---|---|---|
|  |  | 1 | 2 | 3 | 4 | 5 | 6 | 7 |
| Water-absorbent resin 1 | Made by SUMITOMO SEIKA CHEMICALS CO., LTD., trade name: AQUA KEEP 10SH-NF | | | | | | | |
| Water-absorbent resin 2 | Made by SUMITOMO SEIKA CHEMICALS CO., LTD., trade name: AQUA CALK TWB | | | | | | | |
| Calcium carbonate | Made by SHIRAISHI CALCIUM KAISHI, LTD., trade name: Hakuenka CC | | | | | | | |
| Zinc oxide | Made by Sakai Chemical Industry Co., Ltd., trade name: Zinc Flower Class 2 | 5 | 5 | 5 | 5 | 5 | 5 | 5 |
| Antioxidant | Made by Ouchi Shinko Chemical Industrial Co., Ltd., trade name: NOCRAC MB | 2 | 2 | 2 | 2 | 2 | 2 | 2 |
| Paraffinic oil | Made by Idemitan Kosan Co., Ltd., trade name: Diana Process Oil PS-90 | 10 | 10 | 10 | 10 | 10 | 10 | 10 |
| Sulfur | Made by Hosoi Chemical Industry, Co., Ltd., trade name: OIL SULFUR | 2.3 | 2.3 | 2.3 | 2.3 | 2.3 | 2.3 | 2.3 |
| Vulcanization Accelerator | Made by SANSHIN CHEMICAL INDUSTRY CO., LTD., trade name: TET, EZ, MSA | 1.4 | 1.4 | 1.4 | 1.4 | 1.4 | 1.4 | 1.4 |
| Nylon short fibers | Made by Asahi Kasei Corporation. trade name: Leona 66, fiber length: 1 mm | 30 | 30 | 30 | 30 | 30 | 30 | 30 |

TABLE 2

|  |  | Rubber Compositions | | | | | | |
|---|---|---|---|---|---|---|---|---|
|  |  | 8 | 9 | 10 | 11 | 12 | 13 | 14 |
| EPDM | Made By Mitsui Chemical, Inc., trade name: EPT3045 | 100 | 100 | 100 | 100 | 100 | 100 | 100 |
| HAF carbon black | Made by Tokai Carbon Co., Ltd., trade name: SEAST SO | 60 | 60 | 60 | 60 | 60 | 60 | 60 |
| Montmorillonite | Made by HOJUN, trade name: Bengel A | | | | | | | |
| Hectorite | Made by KUNIMINE INDUSTRIES CO., LTD., trade name: Sumecton HE | | | | | | | |
| Kaolinite | Made by SHIRAISHI CALCIUM KAISHA, LTD., trade name: Hard Top Clay | 30 | | | | | | |
| Talc | Made by Nippon Talc Co., Ltd., trade name: MICRO ACE P-8 | | 30 | | | | | |
| Magnesium Oxide | Made by Kyowa Chemical Indeustry Co., Ltd., trade name: MgO-EL | | | 30 | | | | |
| Zinc powder | Made by HakusuiTech Co., Ltd., trade name: Zinc Dust R | | | | 30 | | | |
| Plasticizer | Made by ADEKA CORPORATION, trade name: ADK CIZER RS700 | | | | | 10 | | |
| Surfactant | Made by Rhein Chemie Japan Ltd., trade name: Aflux 54 | | | | | | 10 | |
| Water-absorbent resin 1 | Made by SUMITOMO SEIKA CHEMICALS CO., LTD., trade name: AQUA KEEP 10SH-NF | | | | | | | 10 |
| Water-absorbent resin 2 | Made by SUMITOMO SEIKA CHEMICALS CO., LTD., trade name: AQUA CALK TWB | | | | | | | |
| Calcium carbonate | Made by SHIRAISHI CALCIUM KAISHA, LTD., trade name: Hakuenka CC | | | | | | | |
| Zinc oxide | Made by Sakai Chemical Industry Co., Ltd., trade name: Zinc Flower Class 2 | 5 | 5 | 5 | 5 | 5 | 5 | 5 |
| Antioxidant | Made by Ouchi Shinko Chemical Industrial Co., Ltd., trade name: NOCRAC MB | 2 | 2 | 2 | 2 | 2 | 2 | 2 |
| Paraffinic oil | Made by Idemitan Kosan Co., Ltd., trade name: Diana Process Oil PS-90 | 10 | 10 | 10 | 10 | | 10 | 10 |
| Sulfur | Made by Hosoi Chemical Industry, Co., Ltd., trade name: OIL SULFUR | 2.3 | 2.3 | 2.3 | 2.3 | 2.3 | 2.3 | 2.3 |
| Vulcanization Accelerator | Made by SANSHIN CHEMICAL INDUSTRY CO., LTD., trade name: TET, EZ, MSA | 1.4 | 1.4 | 1.4 | 1.4 | 1.4 | 1.4 | 1.4 |
| Nylon short fibers | Made by Asahi Kasei Corporation. trade name: Leona 66, fiber length: 1 mm | 30 | 30 | 30 | 30 | 30 | 30 | 30 |

|  |  | Rubber Compositions | | | | | | |
|---|---|---|---|---|---|---|---|---|
|  |  | 15 | 16 | 17 | 18 | 19 | 20 | 21 |
| EPDM | Made By Mitsui Chemical, Inc., trade name: EPT3045 | 100 | 100 | 100 | 100 | 100 | 100 | 100 |
| HAF carbon black | Made by Tokai Carbon Co., Ltd., trade name: SEAST SO | 60 | 60 | 60 | 60 | 60 | 60 | 60 |

TABLE 2-continued

| | | | | | | | | |
|---|---|---|---|---|---|---|---|---|
| Montmorillonite | Made by HOJUN, trade name: Bengel A | | 3 | 15 | 25 | 90 | | |
| Hectorite | Made by KUNIMINE INDUSTRIES CO., LTD., trade name: Sumecton HE | | | | | | | |
| Kaolinite | Made by SHIRAISHI CALCIUM KAISHA, LTD., trade name: Hard Top Clay | | | | | | | |
| Talc | Made by Nippon Talc Co., Ltd., trade name: MICRO ACE P-8 | | | | | | | |
| Magnesium Oxide | Made by Kyowa Chemical Indeustry Co., Ltd., trade name: MgO-EL | | | | | | | |
| Zinc powder | Made by HakusuiTech Co., Ltd., trade name: Zinc Dust R | | | | | | | |
| Plasticizer | Made by ADEKA CORPORATION, trade name: ADK CIZER RS700 | | | | | | | |
| Surfactant | Made by Rhein Chemie Japan Ltd., trade name: Aflux 54 | | | | | | | |
| Water-absorbent resin 1 | Made by SUMITOMO SEIKA CHEMICALS CO., LTD., trade name: AQUA KEEP 10SH-NF | | | | | | | |
| Water-absorbent resin 2 | Made by SUMITOMO SEIKA CHEMICALS CO., LTD., trade name: AQUA CALK TWB | 10 | | | | | | |
| Calcium carbonate | Made by SHIRAISHI CALCIUM KAISHA, LTD., trade name: Hakuenka CC | | | | | | | 30 |
| Zinc oxide | Made by Sakai Chemical Industry Co., Ltd., trade name: Zinc Flower Class 2 | 5 | 5 | 5 | 5 | 5 | 5 | 5 |
| Antioxidant | Made by Ouchi Shinko Chemical Industrial Co., Ltd., trade name: NOCRAC MB | 2 | 2 | 2 | 2 | 2 | 2 | 2 |
| Paraffinic oil | Made by Idemitan Kosan Co., Ltd., trade name: Diana Process Oil PS-90 | 10 | 10 | 10 | 10 | 10 | 10 | 10 |
| Sulfur | Made by Hosoi Chemical Industry, Co., Ltd., trade name: OIL SULFUR | 2.3 | 2.3 | 2.3 | 2.3 | 2.3 | 2.3 | 2.3 |
| Vulcanization Accelerator | Made by SANSHIN CHEMICAL INDUSTRY CO., LTD., trade name: TET, EZ, MSA | 1.4 | 1.4 | 1.4 | 1.4 | 1.4 | 1.4 | 1.4 |
| Nylon short fibers | Made by Asahi Kasei Corporation. trade name: Leona 66, fiber length: 1 mm | 30 | 30 | 30 | 30 | 30 | 30 | 30 |

(V-Ribbed Belts)

V-ribbed belts whose compression rubber layers are made of rubber compositions 1-7 were produced as Examples 1-7, respectively. V-ribbed belts whose compression rubber layers are made of rubber compositions 8-21 were produced as Comparative Examples 1-14, respectively.

Note that the adhesion rubber layer and the backing rubber layer of each belt were formed by other EPDM rubber compositions, respectively, and the core wire was formed by twisted yarns of polyethylene terephthalate fibers (PET). Each belt had a circumference of 1,200 mm, a width of 21.36 mm, and a thickness of 4.3 mm, and the number of ribs was 6.

(Test Evaluation Method)

<Mass Change Rate>

A test was conducted on each of rubber compositions 1-21. In the test, a test piece according to JIS K6258 was vulcanized and molded, and both surfaces of the test piece were immersed in distilled water for 1 minute and 10 hours. The mass change rate was calculated by a calculation method according to JIS K6258.

<Evaluation of Abnormal Noise upon Immersion in Water>

Figure 3:
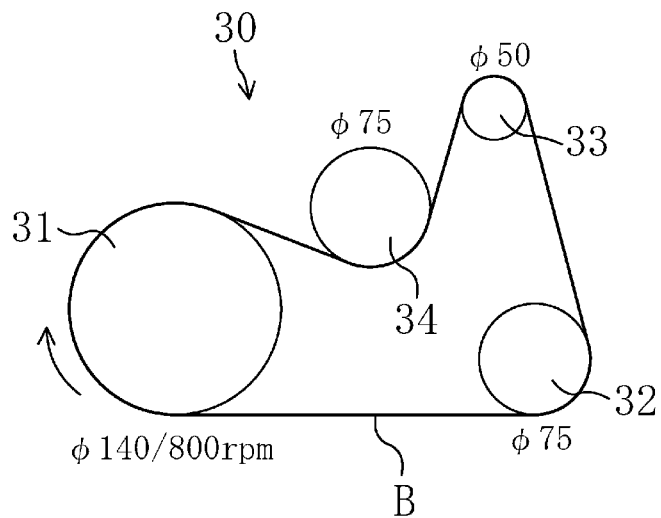
FIG. 3 is a diagram showing a layout of pulleys of a belt running tester for evaluating abnormal noise upon immersion in water.

FIG. 3 shows a layout of pulleys of a belt running tester 30 for evaluating abnormal noise upon immersion in water.

The belt running tester 30 includes a driving pulley 31 as a ribbed pulley having a diameter of 140 mm. A first driven pulley 32 as a ribbed pulley having a diameter of 75 mm is provided on the right side of the driving pulley 31, a second driven pulley 33 as a ribbed pulley having a diameter of 50 mm is provided at a position above the driven pulley 32 and on the upper right side of the driving pulley 31, and an idler pulley 34 as a flat pulley having a diameter of 75 mm is provided between the driving pulley 31 and the second driven pulley 33. The belt running tester 30 is configured so that the V-ribbed belt B is wrapped around these pulleys with the V-shaped ribs of the V-ribbed belt B being in contact with the driving pulley 31 and the first and second driven pulleys 32, 33 as ribbed pulleys and with the back side of the V-ribbed belt B being in contact with the idler pulley 34 as a flat pulley.

Each of the V-ribbed belts of Examples 1-7 and Comparative Examples 1-14 was placed on the belt running tester 30, and the pulleys were positioned so that a tensile force of 49 N per rib is applied to the V-ribbed belt. Resistance was applied to the second driven pulley 33 so that a current of 60 A flows in an alternator having the second driven pulley 33 attached thereto. The driving pulley 31 was rotated at a rotational speed of 800 rpm at normal temperature, and water was dropped at a rate of 100 ml/min onto the V-shaped ribs of the V-ribbed belt B in a region where the V-ribbed belt B reaches the driving pulley 31. Generation of abnormal noise during running of the belt was evaluated in three levels, namely A: no abnormal noise is generated, B: slight abnormal noise is generated, and C: abnormal noise is generated.

<Evaluation of Heat Resistance Durability>

Figure 4:
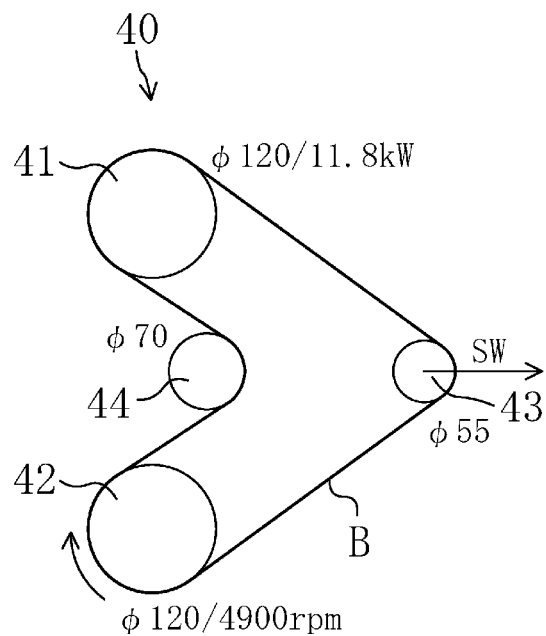
FIG. 4 is a diagram showing a layout of pulleys of a belt running tester for evaluating heat resistance durability.

FIG. 4 shows a layout of pulleys of a belt running tester 40 for evaluating heat resistance durability.

In the belt running tester 40, a large-diameter driven pulley 41 and a driving pulley 42 as ribbed pulleys having a diameter of 120 mm are arranged so as to be spaced apart from each other in the vertical direction. A small-diameter driven pulley 43 as a ribbed pulley having a diameter of 55 mm is provided on the right side of the large-diameter driven pulley 41 and the driving pulley 42 at an intermediate position in the vertical direction between the pulleys 41, 42. Moreover, an idler pulley 44 as a flat pulley having a diameter of 70 mm is provided on the left side of the small-diameter driven pulley 43 at an intermediate position in the vertical direction between the large-diameter driven pulley 41 and the driving pulley 42. This belt running tester 40 is configured so that the V-ribbed belt B is wrapped around these pulleys with the V-shaped ribs of the V-ribbed belt B being in contact with the large-diameter driven pulley 41, the driving pulley 42, and the small-diameter driven pulley 43 as ribbed pulleys, and with the back side of the V-ribbed belt B being in contact with the idler pulley 44 as a flat pulley. Note that the small-diameter driven pulley 43 and the idler pulley 44 are positioned so that the wrap-around angle of the V-ribbed belt B is 90°.

Each of the V-ribbed belts of Examples 1-7 and Comparative Examples 1-14 was placed on the belt running tester 40. Rotation load of 11.8 kW was applied to the large-diameter driven pulley 41, and a set weight of 834 N was laterally applied to the small-diameter driven pulley 43 so that a tensile force is applied to the V-ribbed belt. The driving pulley 42 was rotated at a rotational speed of 4,900 rpm at an ambient temperature of 120° C. to cause the belt to run. The running time until cracks appeared in the compression rubber layer of the V-ribbed belt B and reached the core wire was measured.

<Wear Property>

Figure 5:
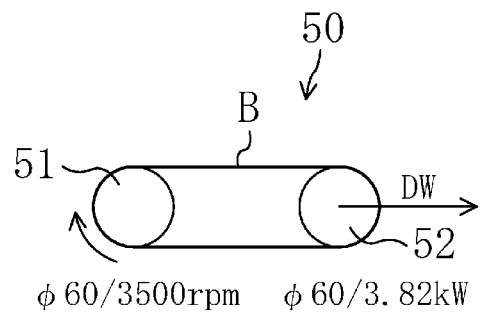
FIG. 5 is a diagram showing a layout of pulleys of a belt running tester for evaluating a wear property.

FIG. 5 shows a layout of pulleys of a belt running tester 50 for evaluating a wear property.

The belt running tester 50 includes a driving pulley 51 and a driven pulley 52 as ribbed pulleys having a diameter of 60 mm and placed on the right and left sides. The belt running tester 50 is configured so that the V-ribbed belt B is wrapped around these pulleys with the V-shaped ribs of the V-ribbed belt B being in contact with both the driving pulley 51 and the driven pulley 52 as ribbed pulleys.

Each of the V-ribbed belts of Examples 1-7 and Comparative Examples 1-14 was placed on the belt running tester 50. Rotation load of 3.82 kW was applied to the driven pulley 52, and a dead weight of 1,177 N was laterally applied to the driven pulley 52 so that a tensile force is applied to the V-ribbed belt. The driving pulley 51 was rotated at a rotational speed of 3,500 rpm at normal temperature to cause the belt to run for 24 hours. A change in mass of the belt, which was obtained by subtracting the mass of the belt after running from the mass of the belt before running, was divided by the mass of the belt before running to calculate a wear rate.

(Test Evaluation Result)

The test result is shown in Tables 3 and 4.

TABLE 3

| | | Examples | | | | | | |
|---|---|---|---|---|---|---|---|---|
| | | 1 | 2 | 3 | 4 | 5 | 6 | 7 |
| Rubber Composition | | 1 | 2 | 3 | 4 | 5 | 6 | 7 |
| Rate of Change in Mass (%) | 1 min | 0.35 | 0.33 | 0.42 | 0.43 | 0.50 | 0.52 | 0.59 |
| Rate of Change in Mass (%) | 10 hr | 0.41 | 0.46 | 0.45 | 0.45 | 0.63 | 0.66 | 0.78 |
| Abnormal Noise upon Immersion in Water | | A | A | A | A | A | A | A |
| Heat Resistance Durability (h) | | 442 | 412 | 401 | 425 | 390 | 418 | 283 |
| Wear Rate (%) | | 1.8 | 1.9 | 2.0 | 1.8 | 2.3 | 1.9 | 2.8 |

TABLE 4

| | | Comparative Examples | | | | | | |
|---|---|---|---|---|---|---|---|---|
| | | 1 | 2 | 3 | 4 | 5 | 6 | 7 |
| Rubber Composition | | 8 | 9 | 10 | 11 | 12 | 13 | 14 |
| Rate of Change in Mass (%) | 1 min | 0.21 | 0.10 | 0.09 | 0.03 | −0.03 | 0.01 | −0.11 |
| Rate of Change in Mass (%) | 10 hr | 0.26 | 0.25 | 0.15 | 0.23 | 0.07 | 0.09 | 0.31 |
| Abnormal Noise upon Immersion in Water | | A | B | B | B | B | B | B |
| Heat Resistance Durability (h) | | 420 | 399 | 408 | 448 | 386 | 406 | 432 |
| Wear Rate (%) | | 1.8 | 1.8 | 1.7 | 2.0 | 3.2 | 3.8 | 1.8 |
| | | Comparative Examples | | | | | | |
| | | 8 | 9 | 10 | 11 | 12 | 13 | 14 |
| Rubber Composition | | 15 | 16 | 17 | 18 | 19 | 20 | 21 |
| Rate of Change in Mass (%) | 1 min | −0.03 | 0.09 | 0.20 | 0.22 | 0.53 | −0.08 | −0.02 |
| Rate of Change in Mass (%) | 10 hr | 0.56 | 0.15 | 0.30 | 0.38 | 0.80 | 0.07 | 0.04 |
| Abnormal Noise upon Immersion in Water | | B | C | C | C | A | C | B |
| Heat Resistance Durability (h) | | 398 | 440 | 440 | 440 | 182 | 445 | 342 |
| Wear Rate (%) | | 1.9 | 1.5 | 1.6 | 1.8 | 3.5 | 1.7 | 2.6 |

For the immersion time of 1 minute, the rates of change in mass of rubber compositions 1-7 corresponding to Examples 1-7 and rubber compositions 8-21 corresponding to Comparative Examples 1-14 are as follows. Rubber composition 1: 0.35%, rubber composition 2: 0.33%, rubber composition 3: 0.42%, rubber composition 4: 0.43%, rubber composition 5: 0.50%, rubber composition 6: 0.52%, and rubber composition 7: 0.59%. Rubber composition 8: 0.21%, rubber composition 9: 0.10%, rubber composition 10: 0.09%, rubber composition 11: 0.03%, rubber composition 12: −0.03%, rubber composition 13: 0.01%, rubber composition 14: −0.11%, rubber composition 15: −0.03%, rubber composition 16: 0.09%, rubber composition 17: 0.20%, rubber composition 18: 0.22%, rubber composition 19: 0.53%, rubber composition 20: −0.08%, and rubber composition 21: −0.02%.

For the immersion time of 10 hours, the rates of change in mass of rubber compositions 1-7 corresponding to Examples 1-7 and rubber compositions 8-21 corresponding to Comparative Examples 1-14 are as follows. Rubber composition 1: 0.41%, rubber composition 2: 0.46%, rubber composition 3: 0.45%, rubber composition 4: 0.45%, rubber composition 5: 0.63%, rubber composition 6: 0.66%, and rubber composition 7: 0.78%. Rubber composition 8: 0.26%, rubber composition 9: 0.25%, rubber composition 10: 0.15%, rubber composition 11: 0.23%, rubber composition 12: 0.07%, rubber composition 13: 0.09%, rubber composition 14: 0.31%, rubber composition 15: 0.56%, rubber composition 16: 0.15%, rubber composition 17: 0.30%, rubber composition 18: 0.38%, rubber composition 19: 0.80%, rubber composition 20: 0.07%, and rubber composition 21: 0.04%.

The evaluation result of abnormal noise upon immersion in water is as follows. Examples 1-7 and Comparative Examples 1 and 12: A, Comparative Examples 2-8 and 14: B, and Comparative Examples 9-11 and 13: C.

The evaluation result of heat resistance durability is as follows. Example 1: 442 hours, Example 2: 412 hours, Example 3: 401 hours, Example 4: 425 hours, Example 5: 390 hours, Example 6: 418 hours, and Example 7: 283 hours. Comparative Example 1: 420 hours, Comparative Example 2: 399 hours, Comparative Example 3: 408 hours, Comparative Example 4: 448 hours, Comparative Example 5: 386 hours, Comparative Example 6: 406 hours, Comparative Example 7: 432 hours, Comparative Example 8: 398 hours, Comparative Example 9: 440 hours, Comparative Example 10: 440 hours, Comparative Example 11: 440 hours, Comparative Example 12: 182 hours, Comparative Example 13: 445 hours, and Comparative Example 14: 342 hours.

The evaluation result of the wear property is as follows. Example 1: 1.8%, Example 2: 1.9%, Example 3: 2.0%, Example 4: 1.8%, Example 5: 2.3%, Example 6: 1.9%, and Example 7: 2.8%. Comparative Example 1: 1.8%, Comparative Example 2: 1.8%, Comparative Example 3: 1.7%, Comparative Example 4: 2.0%, Comparative Example 5: 3.2%, Comparative Example 6: 3.8%, Comparative Example 7: 1.8%, Comparative Example 8: 1.9%, Comparative Example 9: 1.5%, Comparative Example 10: 1.6%, Comparative Example 11: 1.8%, Comparative Example 12: 3.5%, Comparative Example 13: 1.7%, and Comparative Example 14: 2.6%.

[Test Evaluation 2]

(V-Ribbed Belts)

Molded V-ribbed belts of Examples 8 and 9 and Comparative Examples 15-22 below were produced. The respective rubber mixtures of the compression rubber layers of these V-ribbed belts are also shown in Table 5.

TABLE 5

| | | Examples | | Comparative Examples | | | | | | | |
| --- | --- | --- | --- | --- | --- | --- | --- | --- | --- | --- | --- |
| | | 8 | 9 | 15 | 16 | 17 | 18 | 19 | 20 | 21 | 22 |
| EPDM | Made By Mitsui Chemicals, Inc., trade name: EPT3045 | 100 | 100 | 100 | 100 | 100 | 100 | 100 | 100 | 100 | 100 |
| HAF carbon black | Made by Tokai Carbon Co., Ltd., trade name: SEAST SO | 60 | 45 | 60 | 60 | 60 | 60 | 60 | 60 | 60 | 60 |
| Montmorillonite | Made by HOJUN, trade name: Bengel HVP | 30 | 80 | 5 | 10 | | | | | | |
| Montmorillonite-containing material | Made by HOJUN, trade name: SUPER CLAY | | | | | 30 | | | | | |
| Montmorillonite-containing material | Made by HOJUN, trade name: HODAKA | | | | | | | 30 | | | |
| Montmorillonite-containing material | Made by HOJUN, trade name: HARUNA | | | | | | | | 30 | | |
| Calcium carbonate | Made by SHIRAISHI CALCIUM KAISHA, LTD., trade name: Hakuenka CC | | | | | | | | | 30 | |
| Surfactant | Made by Rhein Chemie Japan Ltd., trade name: Aflux 54 | | | | | | | | | | 10 |
| Zinc oxide | Made by Sakai Chemical Industry Co., Ltd., trade name: Zinc Flower Class 2 | 5 | 5 | 5 | 5 | 5 | 5 | 5 | 5 | 5 | 5 |
| Antioxidant | Made by Ouchi Shinko Chemical Industrial Co., Ltd., trade name: NOCRAC MB | 2 | 2 | 2 | 2 | 2 | 2 | 2 | 2 | 2 | 2 |
| Paraffinic oil | Made by Idemitsn Kosan Co., Ltd., trade name: Diana Process Oil PS-90 | 10 | 10 | 10 | 10 | 10 | 10 | 10 | 10 | 10 | 10 |
| Sulfur | Made by Hosoi Chemical Industry, Co., Ltd., trade name: OIL SULFUR | 2.3 | 2.3 | 2.3 | 2.3 | 2.3 | 2.3 | 2.3 | 2.3 | 2.3 | 2.3 |
| Vulcanization Accelerator | Made by SANSHIN CHEMICAL INDUSTRY CO., LTD., trade name: TET, EZ, MSA | 1.4 | 1.4 | 1.4 | 1.4 | 1.4 | 1.4 | 1.4 | 1.4 | 1.4 | 1.4 |
| Nylon short fibers | Made by Asahi Kasei Corporation. trade name: Leona 66, fiber length: 1 mm | 30 | 30 | 30 | 30 | 30 | 30 | 30 | 30 | 30 | 30 |

Example 8

An uncrosslinked rubber composition was produced by mixing 100 parts by mass of EPDM (made by Mitsui Chemical, Inc., trade name: EPT3045) as raw rubber with 60 parts by mass of HAF carbon black (made by Tokai Carbon Co., Ltd., trade name: SEAST SO), 30 parts by mass of montmorillonite (made by HOJUN, trade name: Bengel HVP, swelling power: 44 ml/2 g, cation exchange capacity: 96 meg/100 g), 5 parts by mass of zinc oxide (made by Sakai Chemical Industry Co., Ltd., trade name: Zinc Flower Class 2), 2 parts by mass of an antioxidant (made by Ouchi Shinko Chemical Industrial Co., Ltd., trade name: NOCRAC MB), 10 parts by mass of paraffinic oil (made by Idemitsu Kosan Co., Ltd., trade name: Diana Process Oil PS-90), 2.3 parts by mass of sulfur (made by Hosoi Chemical Industry, Co., Ltd., trade name: OIL SULFUR), 1.4 parts by mass of a vulcanization accelerator (made by SANSHIN CHEMICAL INDUSTRY CO., LTD., trade name: TET, EZ, MSA), and 30 parts by mass of short fibers (made by Asahi Kasei Corporation, trade name: Leona 66, fiber length: 1 mm), and kneading the mixture in an internal kneader for about 5 minutes. A molded V-ribbed belt having a compression rubber layer made of this uncrosslinked rubber composition was produced as Example 8.

Note that the adhesion rubber layer and the backing rubber layer were formed by other EPDM rubber compositions, respectively, and the core wire was formed by twisted yarns of polyethylene terephthalate fibers (PET). The belt had a circumference of 1,200 mm, a width of 21.36 mm, and a thickness of 4.3 mm, and the number of ribs was 6.

Example 9

An uncrosslinked rubber composition was produced which has the same configuration as Example 8 except that this uncrosslinked rubber composition contains 45 parts by mass of HAF carbon black per 100 parts by mass of the raw rubber, and 80 parts by mass of montmorillonite per 100 parts by mass of the raw rubber. A molded V-ribbed belt, which has a compression rubber layer made of this uncrosslinked rubber composition and is similar to Example 8, was produced as Example 9.

Comparative Example 15

An uncrosslinked rubber composition was produced which has the same configuration as Example 8 except that this uncrosslinked rubber composition does not contain montmorillonite. A molded V-ribbed belt, which has a compression rubber layer made of this uncrosslinked rubber composition and is similar to Example 8, was produced as Comparative Example 15.

Comparative Example 16

An uncrosslinked rubber composition was produced which has the same configuration as Example 8 except that this uncrosslinked rubber composition contains 5 parts by mass of montmorillonite per 100 parts by weight of the raw rubber. A molded V-ribbed belt, which has a compression rubber layer made of this uncrosslinked rubber composition and is similar to Example 8, was produced as Comparative Example 16.

Comparative Example 17

An uncrosslinked rubber composition was produced which has the same configuration as Example 8 except that this uncrosslinked rubber composition contains 10 parts by mass of montmorillonite per 100 parts by weight of the raw rubber. A molded V-ribbed belt, which has a compression rubber layer made of this uncrosslinked rubber composition and is similar to Example 8, was produced as Comparative Example 17.

Comparative Example 18

An uncrosslinked rubber composition was produced which has the same configuration as Example 8 except that this uncrosslinked rubber composition contains 30 parts by mass of a montmorillonite-containing material (made by HOJUN, trade name: SUPER CLAY, swelling power: 24 ml/2 g, cation exchange capacity: 65 meg/100 g) per 100 parts by mass of the raw rubber, instead of montmorillonite. A molded V-ribbed belt, which has a compression rubber layer made of this uncrosslinked rubber composition and is similar to Example 8, was produced as Comparative Example 18.

Comparative Example 19

An uncrosslinked rubber composition was produced which has the same configuration as Example 8 except that this uncrosslinked rubber composition contains 30 parts by mass of a montmorillonite-containing material (made by HOJUN, trade name: HODAKA, swelling power: 16 ml/2 g, cation exchange capacity: 86 meg/100 g) per 100 parts by mass of the raw rubber, instead of montmorillonite. A molded V-ribbed belt, which has a compression rubber layer made of this uncrosslinked rubber composition and is similar to Example 8, was produced as Comparative Example 19.

Comparative Example 20

An uncrosslinked rubber composition was produced which has the same configuration as Example 8 except that this uncrosslinked rubber composition contains 30 parts by mass of a montmorillonite-containing material (made by HOJUN, trade name: HARUNA, swelling power: 10 ml/2 g, cation exchange capacity: 69 meg/100 g) per 100 parts by mass of the raw rubber, instead of montmorillonite. A molded V-ribbed belt, which has a compression rubber layer made of this uncrosslinked rubber composition and is similar to Example 8, was produced as Comparative Example 20.

Comparative Example 21

An uncrosslinked rubber composition was produced which has the same configuration as Example 8 except that this uncrosslinked rubber composition contains 30 parts by mass of calcium carbonate (made by SHIRAISHI CALCIUM KAISHA, LTD., trade name: Hakuenka CC) per 100 parts by mass of the raw rubber, instead of montmorillonite. A molded V-ribbed belt, which has a compression rubber layer made of this uncrosslinked rubber composition and is similar to Example 8, was produced as Comparative Example 21.

Comparative Example 22

An uncrosslinked rubber composition was produced which has the same configuration as Example 8 except that this uncrosslinked rubber composition contains 10 parts by mass of a surfactant (made by Rhein Chemie Japan Ltd., trade name: Aflux 54) per 100 parts by mass of the raw rubber, instead of montmorillonite. A molded V-ribbed belt, which has a compression rubber layer made of this uncrosslinked rubber composition and is similar to Example 8, was produced as Comparative Example 22.

(Test Evaluation Method)

<Water Content of Compression Rubber Layer of Molded V-Ribbed Belt>

Test Pieces of the compression rubber layers were cut out from Examples 8 and 9 and Comparative Examples 15-22, and the mass of these test pieces was measured ($W0$ (0.040-0.060 g)). After heating the test pieces at 120° C. for 20 minutes by a water vaporizer, the amount of water (m) contained in volatile components was measured by a Karl Fischer moisture meter. The water content of the compression rubber layer of the molded V-ribbed belt was calculated as $(m/W0) \times 100$ (mass %).

<Evaluation of Water Absorbency>

Test Pieces of the compression rubber layers were cut out from Examples 8 and 9 and Comparative Examples 15, 21, and 22. After immersing the test pieces in water for 12 hours, the mass of the test pieces was measured according to JIS K6258 ($W12$). The rate of change in mass was calculated as $((W12-W0)/W0 \times 100(\%))$.

Test Pieces of the compression rubber layers were cut out from Examples 8 and 9 and Comparative Examples 15-20 and 22. After immersing the test pieces in water for 24 hours, the mass of the test pieces was measured according to JIS K6258 ($W24$). The rate of change in mass was calculated in a manner similar to that described above.

<Evaluation of Abnormal Noise upon Immersion in Water>

Belt running test evaluation for evaluating abnormal noise upon immersion in water was conducted. Regarding Examples 8 and 9 and Comparative Examples 15 and 22, this belt running test evaluation was conducted for the molded V-ribbed belts that had not been immersed in water, the V-ribbed belts that had been immersed in water for 12 hours, and the V-ribbed belts that had been immersed in water for 24 hours. Regarding Comparative Example 21, this belt running test evaluation was conducted for the V-ribbed belts that had been immersed in water for 12 hours. Regarding Comparative Examples 16-20, this belt running test evaluation was conducted for the V-ribbed belts that had been immersed in water for 24 hours.

As in Test Evaluation 1, the V-ribbed belt B was placed on the belt running tester 30 for evaluating abnormal noise upon immersion in water shown in FIG. 3, and the pulleys were positioned so that a tensile force of 49 N per rib is applied to the V-ribbed belt. Resistance was applied to the second driven pulley 33 so that a current of 60 A flows in the alternator having the second driven pulley 33 attached thereto. The driving pulley 31 was rotated at a rotational speed of 800 rpm at normal temperature, and water was dropped at a rate of 1,000 ml/min onto the V-shaped ribs of the V-ribbed belt B in a region where the V-ribbed belt B reaches the driving pulley 31.

Generation of abnormal noise during running of the belt was evaluated in the following five levels. A: no abnormal noise is generated, B: abnormal noise is hardly generated, C: abnormal noise is infrequently generated, D: abnormal noise of 75 dB or more and less than 82 dB is generated, and E: abnormal noise of 82 dB or more is generated.

<Evaluation of Wear Resistance>

Belt running test evaluation for evaluating wear resistance was conducted. Regarding Examples 8 and 9 and Comparative Examples 15 and 22, this belt running test evaluation was conducted for the V-ribbed belts that had been immersed in water for 12 hours, and the V-ribbed belts that had been immersed in water for 24 hours. Regarding Comparative Example 21, this belt running test evaluation was conducted for the V-ribbed belts that had been immersed in water for 12 hours. Regarding Comparative Examples 16-20, this belt running test evaluation was conducted for the V-ribbed belts that had been immersed in water for 24 hours.

As in Test Evaluation 1, the V-ribbed belt B was placed on the belt running tester 50 for evaluating wear resistance shown in FIG. 5. Rotation load of 3.82 kW was applied to the driven pulley 52 and, a dead weight of 1,177 N was laterally applied to the driven pulley 52 so that a tensile force is applied to the V-ribbed belt B. The driving pulley 51 was rotated at a rotational speed of 3,500 rpm at normal temperature to cause the belt to run for 24 hours.

After running of the belt, the surfaces of the pulleys were visually observed to evaluate wear resistance. The V-ribbed belts having adhesive wear were evaluated as "○," and the V-ribbed belts having no adhesive wear were evaluated as "×."

(Test Evaluation Result)

Table 6 shows the test result.

TABLE 6

|  | Examples | | Comparative Examples | | | | | | | |
|---|---|---|---|---|---|---|---|---|---|---|
|  | 8 | 9 | 15 | 16 | 17 | 18 | 19 | 20 | 21 | 22 |
| Water content of compression rubber layer of molded V-ribbed belt (mass %) | 0.38 | 0.90 | 0.21 | 0.26 | 0.31 | 0.33 | 0.27 | 0.24 | 0.21 | 0.23 |
| Rate of change in mass of compression rubber layer after immersion in water for 12 hours (%) | 0.52 | 0.95 | 0.08 | — | — | — | — | — | 0.18 | 0.15 |
| Water content of compression rubber layer of V-ribbed belt after immersion in water for 12 hours (mass %) | 0.90 | 1.85 | 0.29 | — | — | — | — | — | 0.39 | 0.38 |
| Rate of change in mass of compression rubber layer after immersion in water for 24 hours (%) | 0.89 | 1.65 | 0.30 | 0.52 | 0.63 | 0.62 | 0.51 | 0.39 | — | 0.32 |
| Water content of compression rubber layer of V-ribbed belt after immersion in water for 24 hours (mass %) | 1.26 | 2.55 | 0.51 | 0.78 | 0.94 | 0.94 | 0.78 | 0.63 | — | 0.55 |
| Evaluation of abnormal noise upon immersion in water without immersion in water | C | C | E | — | — | — | — | — | — | B |
| Evaluation of abnormal noise upon immersion in water after immersion in water for 12 hours | B | A | E | — | — | — | — | — | D | B |
| Evaluation of abnormal noise upon immersion in water after immersion in water for 24 hours | A | A | D | C | B | B | B | D | — | B |

TABLE 6-continued

|  | Examples | | Comparative Examples | | | | | | | |
| --- | --- | --- | --- | --- | --- | --- | --- | --- | --- | --- |
|  | 8 | 9 | 15 | 16 | 17 | 18 | 19 | 20 | 21 | 22 |
| Evaluation of wear resistance after immersion in water 12 hours | ○ | Δ | ○ | — | — | — | — | — | ○ | × |
| Evaluation of wear resistance after immersion in water 24 hours | ○ | Δ | ○ | ○ | ○ | ○ | ○ | ○ | — | × |

The water content of the compression rubber layer of the molded V-ribbed belt was as follows. Example 8: 0.38 mass %, Example 9: 0.90 mass %, Comparative Example 15: 0.21 mass %, Comparative Example 16: 0.26 mass %, Comparative Example 17: 0.31 mass %, Comparative Example 18: 0.33 mass %, Comparative Example 19: 0.27 mass %, Comparative Example 20: 0.24 mass %, Comparative Example 21: 0.21 mass %, and Comparative Example 22: 0.23 mass %.

The rate of change in mass of the compression rubber layer after immersion in water for 12 hours was as follows. Example 8: 0.52%, Example 9: 0.95%, Comparative Example 15: 0.08%, Comparative Example 21: 0.18%, and Comparative Example 22: 0.15%.

The rate of change in mass of the compression rubber layer after immersion in water for 24 hours was as follows. Example 8: 0.89%, Example 9: 1.65%, Comparative Example 15: 0.30%, Comparative Example 16: 0.52%, Comparative Example 17: 0.63%, Comparative Example 18: 0.62%, Comparative Example 19: 0.51%, Comparative Example 20: 0.39%, and Comparative Example 22: 0.32%.

The water content of the compression rubber layer of the V-ribbed belt after immersion in water for 12 hours was as follows. The water content was calculated by ((m+(W12−W0))/W12)×100 (mass %) based on the mass (W0) of the test piece of the compression rubber layer of the molded V-ribbed belt before the test, the amount (m) of water contained in the test piece, and the mass (W12) of the test piece after immersion in water. Example 8: 0.90 mass %, Example 9: 1.85 mass %, Comparative Example 15: 0.29 mass %, Comparative Example 21: 0.39 mass %, and Comparative Example 22: 0.38 mass %. The water content of the compression rubber layer of the V-ribbed belt after immersion in water for 24 hours was as follows. Example 8: 1.26 mass %, Example 9: 2.55 mass %, Comparative Example 15: 0.51 mass %, Comparative Example 16: 0.78 mass %, Comparative Example 17: 0.94 mass %, Comparative Example 18: 0.94 mass %, Comparative Example 19: 0.78 mass %, Comparative Example 20: 0.63 mass %, and Comparative Example 22: 0.55 mass %.

Regarding the molded V-ribbed belts that had not been immersed in water, the evaluation result of abnormal noise upon immersion in water was as follows. Examples 8 and 9: C, Comparative Example 15: E, and Comparative Example 22: B. Regarding the V-ribbed belts that had been immersed in water for 12 hours, the evaluation result of abnormal noise upon immersion in water was as follows. Example 8: B, Example 9: A, Comparative Example 15: E, Comparative Example 21: D, and Comparative Example 22: B. Regarding the V-ribbed belts that had been immersed in water for 24 hours, the evaluation result of abnormal noise upon immersion in water was as follows. Example 8: A, Example 9: A, Comparative Example 15: D, Comparative Example 16: C, Comparative Example 17: B, Comparative Example 18: B, Comparative Example 19: B, Comparative Example 20: D, and Comparative Example 22: B.

The evaluation result of the wear resistance of the V-ribbed belts that had been immersed in water for 12 hours was as follows. Example 8 and Comparative Examples 15 and 21: ○, Example 9: Δ, and Comparative Example 22: ×. The evaluation result of the wear resistance of the V-ribbed belts that had been immersed in water for 24 hours was as follows. Example 8 and Comparative Examples 15-21: ○, Example 9: Δ, and Comparative Example 22: ×.

It can be seen from the above result that the effect of suppressing abnormal noise upon immersion in water is enhanced in Examples 8 and 9 by performing the process of immersing the V-ribbed belt in water so as to cause the V-ribbed belt to absorb water, whereas this effect is not enhanced in Comparative Examples 15 and 22. The reason for this can be considered as follows. The layered silicate exposed at the contact surface with the pulleys swells as the layered silicate retains water between layers, whereby the friction coefficient of the contact surface with the pulleys can be stabilized.

[Test Evaluation 3]
(V-Ribbed Belts)

Molded V-ribbed belts of Examples 10 and 11 and Comparative Examples 23-29 below were produced. The respective rubber mixtures of the compression rubber layers of these V-ribbed belts are also shown in Table 7.

TABLE 7

|  |  | Examples | | Comparative Examples | | | | | | |
| --- | --- | --- | --- | --- | --- | --- | --- | --- | --- | --- |
|  |  | 10 | 11 | 23 | 24 | 25 | 26 | 27 | 28 | 29 |
| EPDM | Made By Mitsui Chemical, Inc., trade name: EPT3045 | 100 | 100 | 100 | 100 | 100 | 100 | 100 | 100 | 100 |
| HAF carbon black | Made by Tokai Carbon Co., Ltd., trade name: SEAST SO | 60 | 60 | 60 | 60 | 60 | 60 | 60 | 60 | 60 |
| Montmorillonite | Made by HOJUN, trade name: Bengel A | 30 |  |  |  |  |  |  |  |  |
| Hectorite | Made by KUNIMINE INDUSTRIES CO., LTD., trade name: Sumecton HE |  | 30 |  |  |  |  |  |  |  |
| Talc | Made by Nippon Talc Co., Ltd., trade name: SIMGON |  |  |  |  | 30 |  |  |  |  |
| Swelling mica | Made by Co-op Chemical Co., Ltd., trade name: Somashif ME-100 |  |  |  |  |  |  | 30 |  |  |

TABLE 7-continued

| | | Examples | | Comparative Examples | | | | | | |
|---|---|---|---|---|---|---|---|---|---|---|
| | | 10 | 11 | 23 | 24 | 25 | 26 | 27 | 28 | 29 |
| Halloysite | Made by Sigma-Aldrich Co. LLC., trade name: Halloysite nanoclay | | | | | | 30 | | | |
| Non-swelling mica | Made by Co-op Chemical Co., Ltd., trade name: Micromica MK-200 | | | | | | | 30 | | |
| Calcium carbonate | Made by SHIRAISHI CALCIUM KAISHA, LTD., trade name: Hakuenka CC | | | | | | | | 30 | |
| Surfactant | Made by Rhein Chemie Japan Ltd., trade name: Aflux 54 | | | | | | | | | 10 |
| Zinc oxide | Made by Sakai Chemical Industry Co., Ltd., trade name: Zinc Flower Class 2 | 5 | 5 | 5 | 5 | 5 | 5 | 5 | 5 | 5 |
| Antioxidant | Made by Ouchi Shinko Chemical Industrial Co., Ltd., trade name: NOCRAC MB | 2 | 2 | 2 | 2 | 2 | 2 | 2 | 2 | 2 |
| Paraffinic oil | Made by Idemitsn Kosan Co., Ltd., trade name: Diana Process Oil PS-90 | 10 | 10 | 10 | 10 | 10 | 10 | 10 | 10 | 10 |
| Sulfur | Made by Hosoi Chemical Industry, Co., Ltd., trade name: OIL SULFUR | 2.3 | 2.3 | 2.3 | 2.3 | 2.3 | 2.3 | 2.3 | 2.3 | 2.3 |
| Vulcanization Accelerator | Made by SANSHIN CHEMICAL INDUSTRY CO., LTD., trade name: TET, EZ, MSA | 1.4 | 1.4 | 1.4 | 1.4 | 1.4 | 1.4 | 1.4 | 1.4 | 1.4 |
| Nylon short fibers | Made by Asahi Kasei Corporation. trade name: Leona 66, fiber length: 1 mm | 30 | 30 | 30 | 30 | 30 | 30 | 30 | 30 | 30 |

Example 10

An uncrosslinked rubber composition was produced by mixing 100 parts by mass of EPDM (made by Mitsui Chemical, Inc., trade name: EPT3045) as raw rubber with 60 parts by mass of HAF carbon black (made by Tokai Carbon Co., Ltd., trade name: SEAST SO), 30 parts by mass of montmorillonite (made by HOJUN, trade name: Bengel A, swelling power: 46 ml/2 g, cation exchange capacity: 94 meq/100 g), 5 parts by mass of zinc oxide (made by Sakai Chemical Industry Co., Ltd., trade name: Zinc Flower Class 2), 2 parts by mass of an antioxidant (made by Ouchi Shinko Chemical Industrial Co., Ltd., trade name: NOCRAC MB), 10 parts by mass of paraffinic oil (made by Idemitsu Kosan Co., Ltd., trade name: Diana Process Oil PS-90), 2.3 parts by mass of sulfur (made by Hosoi Chemical Industry, Co., Ltd., trade name: OIL SULFUR), 1.4 parts by mass of a vulcanization accelerator (made by SANSHIN CHEMICAL INDUSTRY CO., LTD., trade name: TET, EZ, MSA), and 30 parts by mass of short fibers (made by Asahi Kasei Corporation, trade name: Leona 66, fiber length: 1 mm), and kneading the mixture in an internal kneader for about 5 minutes. A molded V-ribbed belt having a compression rubber layer made of this uncrosslinked rubber composition was produced as Example 10. Montmorillonite in Example 10 is different from that of Example 8 of Test Evaluation 2 only in the product number.

Note that the adhesion rubber layer and the backing rubber layer were formed by other EPDM rubber compositions, respectively, and the core wire was formed by twisted yarns of polyethylene terephthalate fibers (PET). The belt had a circumference of 1,200 mm, a width of 21.36 mm, and a thickness of 4.3 mm, and the number of ribs was 6.

Example 11

An uncrosslinked rubber composition was produced which has the same configuration as Example 10 except that this uncrosslinked rubber composition contains 30 parts by mass of hectorite (made by KUNIMINE INDUSTRIES CO., LTD., trade name: Sumecton HE) per 100 parts by mass of the raw rubber, instead of montmorillonite. A molded V-ribbed belt, which has a compression rubber layer made of this uncrosslinked rubber composition and is similar to Example 10, was produced as Example 11.

Comparative Example 23

An uncrosslinked rubber composition was produced which has the same configuration as Example 10 except that this uncrosslinked rubber composition does not contain montmorillonite. A molded V-ribbed belt, which has a compression rubber layer made of this uncrosslinked rubber composition and is similar to Example 10, was produced as Comparative Example 23. Comparative Example 23 is different from Comparative Example 15 in Test Evaluation 2 only in the lot.

Comparative Example 24

An uncrosslinked rubber composition was produced which has the same configuration as Example 10 except that this uncrosslinked rubber composition contains 30 parts by mass of talc (made by Nippon Talc Co., Ltd., trade name: SIMGON, no surface treatment) per 100 parts by weight of the raw rubber, instead of montmorillonite. A molded V-ribbed belt, which has a compression rubber layer made of this uncrosslinked rubber composition and is similar to Example 10, was produced as Comparative Example 24.

Comparative Example 25

An uncrosslinked rubber composition was produced which has the same configuration as Example 10 except that this uncrosslinked rubber composition contains 30 parts by mass of swelling mica (made by Co-op Chemical Co., Ltd., trade name: Somashif ME-100) per 100 parts by weight of the raw rubber, instead of montmorillonite. A molded V-ribbed belt, which has a compression rubber layer made of this uncrosslinked rubber composition and is similar to Example 10, was produced as Comparative Example 25.

Comparative Example 26

An uncrosslinked rubber composition was produced which has the same configuration as Example 10 except that this uncrosslinked rubber composition contains 30 parts by mass of halloysite (made by Sigma-Aldrich Co. LLC., trade name: Halloysite nanoclay) per 100 parts by mass of the raw rubber, instead of montmorillonite. A molded V-ribbed belt, which has a compression rubber layer made of this uncrosslinked rubber composition and is similar to Example 10, was produced as Comparative Example 26.

Comparative Example 27

An uncrosslinked rubber composition was produced which has the same configuration as Example 10 except that this uncrosslinked rubber composition contains 30 parts by mass of non-swelling mica (made by Co-op Chemical Co., Ltd., trade name: Micromica MK-200) per 100 parts by weight of the raw rubber, instead of montmorillonite. A molded V-ribbed belt, which has a compression rubber layer made of this uncrosslinked rubber composition and is similar to Example 10, was produced as Comparative Example 27.

Comparative Example 28

An uncrosslinked rubber composition was produced which has the same configuration as Example 10 except that this uncrosslinked rubber composition contains 30 parts by mass of calcium carbonate (made by SHIRAISHI CALCIUM KAISHA, LTD., trade name: Hakuenka CC) per 100 parts by mass of the raw rubber, instead of montmorillonite. A molded V-ribbed belt, which has a compression rubber layer made of this uncrosslinked rubber composition and is similar to Example 10, was produced as Comparative Example 28. Comparative Example 28 is different from Comparative Example 21 of Test Evaluation 2 only in the lot.

Comparative Example 29

An uncrosslinked rubber composition was produced which has the same configuration as Example 10 except that this uncrosslinked rubber composition contains 10 parts by mass of a surfactant (made by Rhein Chemie Japan Ltd., trade name: Aflux 54) per 100 parts by mass of the raw rubber, instead of montmorillonite. A molded V-ribbed belt, which has a compression rubber layer made of this uncrosslinked rubber composition and is similar to Example 10, was produced as Comparative Example 29. Comparative Example 29 is different from Comparative Example 22 of Test Evaluation 2 only in the lot.

(Test Evaluation Method)
<Water Content of Compression Rubber Layer of Molded V-Ribbed Belt>

For each of Examples 10 and 11 and Comparative Examples 23-29, the water content of the compression rubber layer of the molded V-ribbed belt was obtained in a manner similar to that in Test Evaluation 2.

<Evaluation of Water Absorbency>

For each of Examples 10 and 11 and Comparative Examples 23-29, the rate of change in mass of the compression rubber layer of the V-ribbed belt after immersion in water for 24 hours was obtained in a manner similar to that in Test Evaluation 2.

<X-Ray Diffractometry Evaluation>

For each of Examples 10 and 11 and Comparative Examples 24-27, a plurality of V-shaped ribs were cut out along the longitudinal direction from each of the molded V-ribbed belt that had not been immersed in water and the V-ribbed belt that had been immersed in water for 24 hours, and the plurality of V-shaped ribs thus cut out were arranged parallel to each other to produce a test piece. A detection peak in a measurement range of $2\theta=0.2$ to $15°$ in X-ray diffractometry was measured by Powder X-Ray Diffractometer Ultima III made by Rigaku Corporation.

<Evaluation of Abnormal Noise upon Immersion in Water>

For each of Examples 10 and 11 and Comparative Examples 23-29, belt running test evaluation for evaluating abnormal noise upon immersion in water was conducted for each of the molded V-ribbed belt that had not been immersed in water and the V-ribbed belt that had been immersed in water for 24 hours, in a manner similar to that in Test Evaluation 1.

<Evaluation of Wear Resistance>

For each of Examples 10 and 11 and Comparative Examples 23-29, belt running test evaluation for evaluating wear resistance was conducted for each of the molded V-ribbed belt that had not been immersed in water and the V-ribbed belt that had been immersed in water for 24 hours, in a manner similar to that in Test Evaluation 1.

(Test Evaluation Result)
Table 8 shows the test result.

TABLE 8

|  | Examples | | Comparative Examples | | | | | | |
| --- | --- | --- | --- | --- | --- | --- | --- | --- | --- |
|  | 10 | 11 | 23 | 24 | 25 | 26 | 27 | 28 | 29 |
| Water content of compression rubber layer of molded V-ribbed belt (mass %) | 0.40 | 0.41 | 0.21 | 0.29 | 0.31 | 0.27 | 0.29 | 0.21 | 0.23 |
| Rate of change in mass of compression rubber layer after immersion in water for 24 hours (%) | 0.89 | 0.92 | 0.30 | 0.58 | 0.78 | 0.58 | 0.34 | 0.39 | 0.32 |
| Water content of compression rubber layer of V-ribbed belt after immersion in water for 24 hours (mass %) | 1.28 | 1.32 | 0.51 | 0.86 | 1.08 | 0.65 | 0.63 | 0.60 | 0.55 |
| X-ray diffraction peak detection single without immersion in water ($2\theta$) | 7.70 | 7.50 | — | 9.50 | 8.50 | 12.8 | 8.80 | — | — |
| X-ray diffraction peak detection single after immersion in water for 24 hours ($2\theta$) | 5.50 | 5.40 | — | 8.70 | 6.20 | 12.3 | 8.60 | — | — |
| Evaluation of abnormal noise upon immersion in water without immersion in water | B | B | E | C | C | C | D | D | C |
| Evaluation of abnormal noise upon immersion in water after immersion in water for 24 hours | A | A | E | B | A | C | D | D | C |
| Evaluation of wear resistance without immersion in water | ○ | ○ | ○ | ○ | ○ | ○ | ○ | ○ | x |
| Evaluation of wear resistance after immersion in water 24 hours | ○ | ○ | ○ | ○ | ○ | ○ | ○ | ○ | x |

The water content of the compression rubber layer of the molded V-ribbed belt was as follows. Example 10: 0.40 mass %, Example 11: 0.41 mass %, Comparative Example 23: 0.21 mass %, Comparative Example 24: 0.29 mass %, Comparative Example 25: 0.31 mass %, Comparative Example 26: 0.27 mass %, Comparative Example 27: 0.29 mass %, Comparative Example 28: 0.21 mass %, and Comparative Example 29: 0.23 mass %.

The rate of change in mass of the compression rubber layer after immersion in water for 24 hours was as follows. Example 10: 0.89%, Example 11: 0.92%, Comparative Example 23: 0.30%, Comparative Example 24: 0.58%, Comparative Example 25: 0.78%, Comparative Example 26: 0.38%, Comparative Example 27: 0.34%, Comparative Example 28: 0.39%, and Comparative Example 29: 0.32%.

The water content of the V-ribbed belt that had been immersed in water for 24 hours, as calculated from the water content of the compression rubber layer of the molded V-ribbed belt and the rate of change in mass after immersion in water, was as follows. Example 10: 1.28 mass %, Example 11: 1.32 mass %, Comparative Example 23: 0.51 mass %, Comparative Example 24: 0.86 mass %, Comparative Example 25: 1.08 mass %, Comparative Example 26: 0.65 mass %, Comparative Example 27: 0.63 mass %, Comparative Example 28: 0.60 mass %, and Comparative Example 29: 0.55 mass %.

Regarding the molded V-ribbed belts that had not been immersed in water, the evaluation result of abnormal noise upon immersion in water was as follows. Example 10: B, Example 11: B, Comparative Example 23: E, Comparative Example 24: C, Comparative Example 25: C, Comparative Example 26: C, Comparative Example 27: D, Comparative Example 28: D, and Comparative Example 29: C. Regarding the V-ribbed belts that had been immersed in water for 24 hours, the evaluation result of abnormal noise upon immersion in water was as follows. Example 10: A, Example 11: A, Comparative Example 23: E, Comparative Example 24: B, Comparative Example 25: A, Comparative Example 26: C, Comparative Example 27: D, Comparative Example 28: D, and Comparative Example 29: C.

The evaluation result of the wear resistance of the molded V-ribbed belts that had not been immersed in water was as follows. Example 10, Example 11, and Comparative Examples 23-28: ○, and Example 29: ×. The evaluation result of the wear resistance of the V-ribbed belts that had been immersed in water for 24 hours was as follows. Example 10, Example 11, and Comparative Examples 23-28: ○, and Comparative example 29: ×.

[Test Evaluation 4]

(V-Ribbed Belts)

Molded V-ribbed belts of Example 12 and Comparative Example 30 below were produced. The respective rubber mixtures of the compression rubber layers of these V-ribbed belts are also shown in Table 9.

TABLE 9

|  |  | Example 12 | Comparative Example 30 |
|---|---|---|---|
| EPDM | Made by Mitsui Chemical, Inc., trade name: EPT3045 | 100 | 100 |
| HAF carbon black | Made by Tokai Carbon Co., Ltd., trade name: SEAST SO | 60 | 60 |
| Montmorillonite | Made by HOJUN, trade name: Bengel A | 30 | |
| Zinc oxide | Made by Sakai Chemical Industry Co., Ltd., trade name: Zinc Flower Class 2 | 5 | 5 |
| Stearic acid | Made by NOF CORPORATION, trade name: STEARIC ACID CAMELLIA | 1 | 1 |
| Antioxidant | Made by Ouchi Shinko Chemical Industrial Co., Ltd., trade name: NOCRAC MB | 2 | 2 |
| Paraffinic oil | Made by Idemitsu Kosan Co., Ltd., trade name: Diana Process Oil PS-90 | 10 | 10 |
| Sulfur | Made by Hosoi Chemical Industry, Co., Ltd., trade name: OIL SULFUR | 2.3 | 2.3 |
| Vulcanization accelerator | Made by Ouchi Shinko Chemical Industrial Co., Ltd., trade name: EP-150 | 4 | 4 |
| Nylon short fibers | Made by Asahi Kasei Corporation, trade name: Leona 66, fiber length: 1 mm | 30 | 30 |

Example 12

An uncrosslinked rubber composition was produced by mixing 100 parts by mass of EPDM (made by Mitsui Chemical, Inc., trade name: EPT3045) as raw rubber with 60 parts by mass of HAF carbon black (made by Tokai Carbon Co., Ltd., trade name: SEAST SO), 30 parts by mass of montmorillonite (made by HOJUN, trade name: Bengel A), 5 parts by mass of zinc oxide (made by Sakai Chemical Industry Co., Ltd., trade name: Zinc Flower Class 2), 1 part by mass of stearic acid (made by NOF CORPORATION, trade name: STEARIC ACID CAMELLIA), 2 parts by mass of an antioxidant (made by Ouchi Shinko Chemical Industrial Co., Ltd., trade name: NOCRAC MB), 10 parts by mass of paraffinic oil (made by Idemitsu Kosan Co., Ltd., trade name: Diana Process Oil PS-90), 2.3 parts by mass of sulfur (made by Hosoi Chemical Industry, Co., Ltd., trade name: OIL SULFUR), 4 parts by mass of a vulcanization accelerator (made by Ouchi Shinko Chemical Industrial Co., Ltd., trade name: EP-150), and 30 parts by mass of short fibers (made by Asahi Kasei Corporation, trade name: Leona 66, fiber length: 1 mm), and kneading the mixture in an internal kneader for about 5 minutes. A molded V-ribbed belt having a compression rubber layer made of this uncrosslinked rubber composition was produced as Example 12.

Note that the adhesion rubber layer and the backing rubber layer were formed by other EPDM rubber compositions, respectively, and the core wire was formed by twisted yarns of polyethylene terephthalate fibers (PET). The belt had a circumference of 1,200 mm, a width of 21.36 mm, and a thickness of 4.3 mm, and the number of ribs was 6.

Comparative Example 30

An uncrosslinked rubber composition was produced which has the same configuration as Example 12 except that this uncrosslinked rubber composition does not contain montmorillonite. A molded V-ribbed belt, which has a compression rubber layer made of this uncrosslinked rubber composition and is similar to Example 12, was produced as Comparative Example 30.

(Test Evaluation Method)

<Water Content of Compression Rubber Layer of Molded V-Ribbed Belt>

For each of Example 12 and Comparative Example 30, the water content of the compression rubber layer of the molded V-ribbed belt was obtained in a manner similar to that in Test Evaluation 2.

<Evaluation of Water Absorbency of Belt>

For each of Example 12 and Comparative Example 30, the rate of change in mass of the compression rubber layer of the molded V-ribbed belt after immersion in water for 24 hours was obtained in a manner similar to that in Test Evaluation 1.

<Area Ratio of Layered Silicate>

For each of Example 12 and Comparative Example 30, the area ratio of the layered silicate on the V-ribbed surface of the compression rubber layer to the V-ribbed surface of the compression rubber layer was obtained for each of the molded V-ribbed belt that had not been immersed in water and the V-ribbed belt that had been immersed in water for 24 hours, by calculating the proportion of the area of bright spots of Si elements in a mapping image of the Si elements, by using an elemental analyzer (made by HORIBA, Ltd., X-Ray Analyzer EMAX EX-250) in observation using a scanning electron microscope (made by Hitachi High-Technologies Corporation, Scanning Electron Microscope S-4800) at 300 magnifications.

<Evaluation of Abnormal Noise upon Immersion in Water>

For each of Example 12 and Comparative Example 30, belt running test evaluation for evaluating abnormal noise upon immersion in water was conducted for each of the molded V-ribbed belt that had not been immersed in water and the V-ribbed belt that had been immersed in water for 24 hours, in a manner similar to that in Test Evaluation 2.

<Evaluation of Wear Resistance>

For each of Example 12 and Comparative Example 30, belt running test evaluation for evaluating wear resistance was conducted for the molded V-ribbed belt that had not been immersed in water, in a manner similar to that in Test Evaluation 2.

(Test Evaluation Result)

Table 10 shows the test result.

TABLE 10

| | Example 12 | Comparative Example 30 |
|---|---|---|
| Water content of compression rubber layer of molded V-ribbed belt (mass %) | 0.39 | 0.22 |
| Rate of change in mass of compression rubber layer after immersion in water for 24 hours (%) | 0.88 | 0.31 |
| Water content of compression rubber layer of V-ribbed belt after immersion in water for 24 hours (mass %) | 1.26 | 0.53 |
| Area ratio of layered silicate of molded V-ribbed belt (%) | 12 | — |
| Area ratio of layered silicate after immersion in water for 24 hours (%) | 16 | — |
| Evaluation of abnormal noise upon immersion in water without immersion in water | B | E |
| Evaluation of abnormal noise upon immersion in water after immersion in water for 24 hours | A | E |
| Evaluation fo wear resistance without immersion in water | ○ | ○ |

The water content of the compression rubber layer of the molded V-ribbed belt was as follows. Example 12: 0.39 mass % and Comparative Example 30: 0.22 mass %.

The rate of change in mass of the compression rubber layer after immersion in water for 24 hours was as follows. Example 12: 0.88% and Comparative Example 30: 0.31%

The water content of the molded V-ribbed belt that had been immersed in water for 24 hours, as calculated from the water content of the compression rubber layer of the molded V-ribbed belt and the rate of change in mass after immersion in water, was as follows. Example 12: 1.26 mass % and Comparative Example 30: 0.53 mass %.

The area ratio of the layered silicate in the compression rubber layer of the molded V-ribbed belt was 12% in Example 12. The area ratio of the layered silicate in the compression rubber layer of the V-ribbed belt that had been immersed in water for 24 hours was 16% in Example 12.

Regarding the molded V-ribbed belts that had not been immersed in water, the evaluation result of abnormal noise upon immersion in water was as follows. Example 12: B and Comparative Example 30: E. Regarding the V-ribbed belts that had been immersed in water for 24 hours, the evaluation result of abnormal noise upon immersion in water was as follows. Example 12: A and Comparative Example 30: E.

The evaluation result of the wear resistance of the molded V-ribbed belts that had not been immersed in water was as follows. Example 12 and Comparative Example 30: ○.

It can be seen from the above results that the effect of suppressing abnormal noise upon immersion in water is enhanced in Example 12 by causing the V-ribbed belt itself to absorb water, whereas this effect is not enhanced in Comparative Example 30.

INDUSTRIAL APPLICABILITY

The present invention is useful for friction drive belts having a belt body wrapped around pulleys in contact therewith to transmit power, and manufacturing methods thereof, and belt transmission systems including the same.

DESCRIPTION OF REFERENCE CHARACTERS

B V-Ribbed Belt (Friction Drive Belt)
10 V-Ribbed Belt Body
15 V-Shaped Rib (Pulley Contact Portion)

The invention claimed is:

1. A friction drive belt, comprising:
a belt body configured to be wrapped around pulleys in contact therewith to transmit power therebetween,
wherein at least a pulley contact portion of the belt body is made of a rubber composition comprising:
raw rubber containing an ethylene-α-olefin elastomer; and
at least one layered silicate selected from monmorillonite and hectorite and having swelling power of 40 ml/2 g or more, and in an amount of 30-60 parts by mass per 100 parts mass of the rubber,
wherein a water content of the rubber composition is 0.7-3.0 mass % of the rubber composition, and
wherein the at least one layered silicate has a water swelling property such that a rate of change in mass of the rubber composition that forms the pulley contact portion is 0.1% or more when the rubber composition is immersed in water for one minute.

2. The friction drive belt of claim 1, wherein the layered silicate has cation exchange capacity of 70 meg/100 g or more.

3. The friction drive belt of claim 1, wherein the rubber composition that forms the pulley contact portion has a detection peak of 2θ=9° or less in a measurement range of 2θ=0.2 to 15° in X-ray diffractometry.

4. The friction drive belt of claim 1, wherein an area ratio of the layered silicate exposed at a surface of the pulley contact portion to the surface of the pulley contact portion is 12% or more.

5. The friction drive belt of claim 1, wherein the layered silicate contains montmorillonite.

6. The friction drive belt of claim 1, wherein the belt body is a V-ribbed belt body.

7. A belt transmission system, comprising:
the friction drive belt of claim 1 wrapped around a plurality of pulleys.

8. The belt transmission system of claim 7, wherein the belt transmission system is an accessory drive belt transmission system for an automobile.

9. A method for manufacturing a friction drive belt, comprising the step of:
forming a drive belt in accordance with claim 1, including the sub-step of placing a molded friction drive belt, in which at least the pulley contact portion of the belt main body is made of the rubber composition formed by mixing the layered silicate with the raw rubber, in a water vapor atmosphere or water for a predetermined time.

10. The method of claim 9, wherein the molded friction drive belt is placed in the water vapor atmosphere or the water for 8 hours or more.

11. The friction drive belt of claim 3, wherein the layered silicate has cation exchange capacity of 70 meg/100 g or more.

12. The friction drive belt of claim 1 wherein the ethylene-α-olefin elastomer is EPDM and the at least one layered silicate is selected from montmorillonite and hectorite.

* * * * *